(12) United States Patent
Berenson et al.

(10) Patent No.: US 9,377,865 B2
(45) Date of Patent: Jun. 28, 2016

(54) ZOOM-BASED GESTURE USER INTERFACE

(71) Applicant: PRIMESENSE LTD., Tel Aviv (IL)

(72) Inventors: Adi Berenson, Tel Aviv (IL); Dana Cohen, Tel Aviv (IL); Micha Galor, Tel Aviv (IL); Jonathan Pokrass, Bat-Yam (IL); Ran Shani, Ramat Hasharon (IL); Daniel Shein, Tel Aviv (IL); Orlee Tal, Tel Aviv (IL); Arnon Yaari, Hod Hasharon (IL); Eran Weissenstern, Jerusalem (IL); Martin Frey, Munich (DE); Amir Hoffnung, Tel Aviv (IL); Nili Metuki, Even-Yehuda (IL); Marcus Hauer, Munich (DE)

(73) Assignee: APPLE INC., Cupertino, CA (US)

( * ) Notice: Subject to any disclaimer, the term of this patent is extended or adjusted under 35 U.S.C. 154(b) by 565 days.

(21) Appl. No.: 13/904,050

(22) Filed: May 29, 2013

(65) Prior Publication Data

US 2013/0265222 A1 Oct. 10, 2013

Related U.S. Application Data

(63) Continuation-in-part of application No. 13/541,786, filed on Jul. 5, 2012.

(60) Provisional application No. 61/504,339, filed on Jul. 5, 2011, provisional application No. 61/521,448, filed on Aug. 9, 2011, provisional application No. 61/523,349, filed on Aug. 14, 2011, provisional application No. 61/652,899, filed on May 30, 2012.

(51) Int. Cl.
*G06F 3/00* (2006.01)
*G06F 3/01* (2006.01)
*G06F 3/0482* (2013.01)

(52) U.S. Cl.
CPC .............. *G06F 3/017* (2013.01); *G06F 3/0482* (2013.01); *G06F 2203/04806* (2013.01)

(58) Field of Classification Search
CPC .... G06F 3/017; G06F 3/0482; G06F 2203/048
USPC ............................................................ 715/800
See application file for complete search history.

(56) References Cited

U.S. PATENT DOCUMENTS 4,550,250 A 10/1985 Mueller et al.
4,789,921 A 12/1988 Aho
(Continued)

FOREIGN PATENT DOCUMENTS

WO 9935633 A1 7/1999
WO 03071410 A2 8/2003
(Continued)

OTHER PUBLICATIONS

Bleiwess et al., "Fusing Time-of-Flight Depth and Color for Real-Time Segmentation and Tracking", Dyn3D 2009, Lecture Notes in Computer Science 5742, pp. 58-69, Jena, Germany, Sep. 9, 2009.
(Continued)

*Primary Examiner* — David Phantana Angkool
(74) *Attorney, Agent, or Firm* — D. Kligler IP Services Ltd.

(57) ABSTRACT

A method includes arranging, by a computer, multiple interactive objects as a hierarchical data structure, each node of the hierarchical data structure associated with a respective one of the multiple interactive objects, and presenting, on a display coupled to the computer, a first subset of the multiple interactive objects that are associated with one or more child nodes of one of the multiple interactive objects. A sequence of three-dimensional (3D) maps including at least part of a hand of a user positioned in proximity to the display is received, and the hand performing a transverse gesture followed by a grab gesture followed by a longitudinal gesture followed by an execute gesture is identified in the sequence of three-dimensional (3D) maps, and an operation associated with the selected object is accordingly performed.

17 Claims, 8 Drawing Sheets

(56) References Cited

U.S. PATENT DOCUMENTS

| | | | |
|---|---|---|---|
| 4,988,981 A | 1/1991 | Zimmerman et al. | |
| 5,264,836 A | 11/1993 | Rubin | |
| 5,495,576 A | 2/1996 | Ritchey | |
| 5,588,139 A | 12/1996 | Lanier et al. | |
| 5,594,469 A | 1/1997 | Freeman et al. | |
| 5,846,134 A | 12/1998 | Latypov | |
| 5,852,672 A | 12/1998 | Lu | |
| 5,862,256 A | 1/1999 | Zetts et al. | |
| 5,864,635 A | 1/1999 | Zetts et al. | |
| 5,870,196 A | 2/1999 | Lulli et al. | |
| 5,917,937 A | 6/1999 | Szeliski et al. | |
| 5,973,700 A | 10/1999 | Taylor et al. | |
| 6,002,808 A | 12/1999 | Freeman | |
| 6,005,548 A | 12/1999 | Latypov et al. | |
| 6,064,387 A | 5/2000 | Canaday et al. | |
| 6,072,494 A | 6/2000 | Nguyen | |
| 6,084,979 A | 7/2000 | Kanade et al. | |
| 6,111,580 A | 8/2000 | Kazama et al. | |
| 6,191,773 B1 | 2/2001 | Maruno et al. | |
| 6,215,890 B1 | 4/2001 | Matsuo et al. | |
| 6,229,541 B1 | 5/2001 | Kamen et al. | |
| 6,243,054 B1 | 6/2001 | DeLuca | |
| 6,252,988 B1 | 6/2001 | Ho | |
| 6,256,033 B1 | 7/2001 | Nguyen | |
| 6,262,740 B1 | 7/2001 | Lauer et al. | |
| 6,345,111 B1 | 2/2002 | Yamaguchi et al. | |
| 6,345,893 B2 | 2/2002 | Fateh et al. | |
| 6,452,584 B1 | 9/2002 | Walker et al. | |
| 6,456,262 B1 | 9/2002 | Bell | |
| 6,507,353 B1 | 1/2003 | Huard et al. | |
| 6,512,838 B1 | 1/2003 | Rafii et al. | |
| 6,519,363 B1 | 2/2003 | Su et al. | |
| 6,559,813 B1 | 5/2003 | DeLuca et al. | |
| 6,581,068 B1 * | 6/2003 | Bensoussan | G06F 17/30457 |
| 6,681,031 B2 | 1/2004 | Cohen et al. | |
| 6,686,921 B1 | 2/2004 | Rushmeier et al. | |
| 6,690,370 B2 | 2/2004 | Ellenby et al. | |
| 6,741,251 B2 | 5/2004 | Malzbender | |
| 6,791,540 B1 | 9/2004 | Baumberg | |
| 6,803,928 B2 | 10/2004 | Bimber et al. | |
| 6,853,935 B2 | 2/2005 | Satoh et al. | |
| 6,857,746 B2 | 2/2005 | Dyner | |
| 6,951,515 B2 | 10/2005 | Ohshima et al. | |
| 6,977,654 B2 | 12/2005 | Malik et al. | |
| 7,003,134 B1 | 2/2006 | Covell et al. | |
| 7,013,046 B2 | 3/2006 | Kawamura et al. | |
| 7,023,436 B2 | 4/2006 | Segawa et al. | |
| 7,042,440 B2 | 5/2006 | Pryor et al. | |
| 7,042,442 B1 | 5/2006 | Kanevsky et al. | |
| 7,151,530 B2 | 12/2006 | Roeber et al. | |
| 7,170,492 B2 | 1/2007 | Bell | |
| 7,215,815 B2 | 5/2007 | Honda | |
| 7,227,526 B2 | 6/2007 | Hildreth et al. | |
| 7,257,237 B1 | 8/2007 | Luck et al. | |
| 7,259,747 B2 | 8/2007 | Bell | |
| 7,264,554 B2 | 9/2007 | Bentley | |
| 7,289,227 B2 | 10/2007 | Smetak et al. | |
| 7,289,645 B2 | 10/2007 | Yamamoto et al. | |
| 7,295,697 B1 | 11/2007 | Satoh | |
| 7,301,648 B2 | 11/2007 | Foxlin | |
| 7,302,099 B2 | 11/2007 | Zhang et al. | |
| 7,333,113 B2 | 2/2008 | Gordon | |
| 7,340,077 B2 | 3/2008 | Gokturk | |
| 7,340,399 B2 | 3/2008 | Friedrich et al. | |
| 7,348,963 B2 | 3/2008 | Bell | |
| 7,358,972 B2 | 4/2008 | Gordon et al. | |
| 7,370,883 B2 | 5/2008 | Basir et al. | |
| 7,427,996 B2 | 9/2008 | Yonezawa et al. | |
| 7,428,542 B1 | 9/2008 | Fink et al. | |
| 7,433,024 B2 | 10/2008 | Garcia et al. | |
| 7,474,256 B2 | 1/2009 | Ohta et al. | |
| 7,508,377 B2 | 3/2009 | Pihlaja et al. | |
| 7,526,120 B2 | 4/2009 | Gokturk et al. | |
| 7,536,032 B2 | 5/2009 | Bell | |
| 7,573,480 B2 | 8/2009 | Gordon | |
| 7,576,727 B2 | 8/2009 | Bell | |
| 7,580,572 B2 | 8/2009 | Bang et al. | |
| 7,590,941 B2 | 9/2009 | Wee et al. | |
| 7,688,998 B2 | 3/2010 | Tuma et al. | |
| 7,696,876 B2 | 4/2010 | Dimmer et al. | |
| 7,724,250 B2 | 5/2010 | Ishii et al. | |
| 7,762,665 B2 | 7/2010 | Vertegaal et al. | |
| 7,774,155 B2 | 8/2010 | Sato et al. | |
| 7,812,842 B2 | 10/2010 | Gordon | |
| 7,821,541 B2 | 10/2010 | Delean | |
| 7,834,847 B2 | 11/2010 | Boillot | |
| 7,840,031 B2 | 11/2010 | Albertson et al. | |
| 7,844,914 B2 | 11/2010 | Andre et al. | |
| 7,925,549 B2 | 4/2011 | Looney et al. | |
| 7,971,156 B2 | 6/2011 | Albertson et al. | |
| 8,018,579 B1 | 9/2011 | Krah | |
| 8,150,142 B2 | 4/2012 | Freedman et al. | |
| 8,154,781 B2 | 4/2012 | Kroll et al. | |
| 8,166,421 B2 | 4/2012 | Magal et al. | |
| 8,183,977 B2 | 5/2012 | Matsumoto | |
| 8,194,921 B2 | 6/2012 | Kongqiao et al. | |
| 8,214,098 B2 | 7/2012 | Murray et al. | |
| 8,218,211 B2 | 7/2012 | Kroll et al. | |
| 8,249,334 B2 | 8/2012 | Berliner et al. | |
| 8,368,647 B2 | 2/2013 | Lin | |
| 8,390,821 B2 | 3/2013 | Shpunt et al. | |
| 8,396,252 B2 | 3/2013 | El Dokor | |
| 8,400,494 B2 | 3/2013 | Zalevsky et al. | |
| 8,405,604 B2 | 3/2013 | Pryor et al. | |
| 8,416,276 B2 | 4/2013 | Kroll et al. | |
| 8,446,459 B2 | 5/2013 | Fang et al. | |
| 8,448,083 B1 | 5/2013 | Migos et al. | |
| 8,462,199 B2 | 6/2013 | Givon | |
| 8,493,496 B2 | 7/2013 | Freedman et al. | |
| 8,514,221 B2 | 8/2013 | King et al. | |
| 8,514,251 B2 | 8/2013 | Hildreth et al. | |
| 8,625,882 B2 | 1/2014 | Backlund et al. | |
| 8,660,869 B2 * | 2/2014 | MacIntyre | G06F 17/30536 705/1.1 |
| 8,935,631 B2 * | 1/2015 | Leonard | G06F 3/0488 345/660 |
| 8,990,733 B2 * | 3/2015 | Deutsch | G06F 3/0481 715/764 |
| 8,996,173 B2 | 3/2015 | Itkowitz | |
| 9,015,606 B2 * | 4/2015 | Zaman | G06F 3/048 715/756 |
| 9,030,528 B2 | 5/2015 | Pesach | |
| 9,030,529 B2 | 5/2015 | Chen | |
| 9,052,820 B2 * | 6/2015 | Jarrett | G06F 9/4443 |
| 9,058,307 B2 * | 6/2015 | Tien | G06F 17/21 |
| 9,075,441 B2 | 7/2015 | St. Hilaire | |
| 9,075,460 B2 * | 7/2015 | Mak | G06F 3/041 |
| 9,104,271 B1 * | 8/2015 | Adams | G06F 3/0426 |
| 9,104,440 B2 * | 8/2015 | Jarrett | G06F 3/04883 |
| 9,158,445 B2 * | 10/2015 | Wong | G06F 3/0488 |
| 9,207,955 B2 * | 12/2015 | Wenig | H04L 67/22 |
| 9,213,468 B2 * | 12/2015 | Zaman | G06F 3/0482 |
| 2002/0057383 A1 | 5/2002 | Iwamura | |
| 2002/0071607 A1 | 6/2002 | Kawamura et al. | |
| 2002/0158873 A1 | 10/2002 | Williamson | |
| 2003/0057972 A1 | 3/2003 | Pfaff et al. | |
| 2003/0063775 A1 | 4/2003 | Rafii et al. | |
| 2003/0071814 A1 * | 4/2003 | Jou | G06F 9/542 345/440 |
| 2003/0088463 A1 | 5/2003 | Kanevsky | |
| 2003/0156756 A1 | 8/2003 | Gokturk et al. | |
| 2003/0185444 A1 | 10/2003 | Honda | |
| 2003/0227453 A1 | 12/2003 | Beier et al. | |
| 2003/0235341 A1 | 12/2003 | Gokturk et al. | |
| 2004/0046744 A1 | 3/2004 | Rafii et al. | |
| 2004/0104935 A1 | 6/2004 | Williamson | |
| 2004/0135744 A1 | 7/2004 | Bimber et al. | |
| 2004/0155962 A1 | 8/2004 | Marks | |
| 2004/0174770 A1 | 9/2004 | Rees | |
| 2004/0183775 A1 | 9/2004 | Bell | |
| 2004/0184640 A1 | 9/2004 | Bang et al. | |
| 2004/0184659 A1 | 9/2004 | Bang et al. | |
| 2004/0193413 A1 | 9/2004 | Wilson et al. | |
| 2004/0222977 A1 | 11/2004 | Bear et al. | |

(56) References Cited

U.S. PATENT DOCUMENTS

| | | |
|---|---|---|
| 2007/4025831 | 12/2004 | Hashimoto |
| 2005/0031166 A1 | 2/2005 | Fujimura et al. |
| 2005/0088407 A1 | 4/2005 | Bell et al. |
| 2005/0089194 A1 | 4/2005 | Bell |
| 2005/0110964 A1 | 5/2005 | Bell et al. |
| 2005/0122308 A1 | 6/2005 | Bell et al. |
| 2005/0162381 A1 | 7/2005 | Bell et al. |
| 2005/0190972 A1 | 9/2005 | Thomas et al. |
| 2005/0254726 A1 | 11/2005 | Fuchs et al. |
| 2005/0265583 A1 | 12/2005 | Covell et al. |
| 2006/0010400 A1 | 1/2006 | Dehlin et al. |
| 2006/0020905 A1 | 1/2006 | Wroblewski |
| 2006/0092138 A1 | 5/2006 | Kim et al. |
| 2006/0110008 A1 | 5/2006 | Vertegaal et al. |
| 2006/0115155 A1 | 6/2006 | Lui et al. |
| 2006/0139314 A1 | 6/2006 | Bell |
| 2006/0149737 A1 | 7/2006 | Du et al. |
| 2006/0159344 A1 | 7/2006 | Shao et al. |
| 2006/0187196 A1 | 8/2006 | Underkoffler et al. |
| 2006/0239670 A1 | 10/2006 | Cleveland |
| 2006/0248475 A1 | 11/2006 | Abrahamsson |
| 2007/0060336 A1 | 3/2007 | Marks et al. |
| 2007/0078552 A1 | 4/2007 | Rosenberg |
| 2007/0130547 A1 | 6/2007 | Boillot |
| 2007/0154116 A1 | 7/2007 | Shieh |
| 2007/0230789 A1 | 10/2007 | Chang et al. |
| 2007/0285554 A1 | 12/2007 | Givon |
| 2008/0030460 A1 | 2/2008 | Hildreth et al. |
| 2008/0059915 A1 | 3/2008 | Boillot |
| 2008/0062123 A1 | 3/2008 | Bell |
| 2008/0094371 A1 | 4/2008 | Forstall et al. |
| 2008/0123940 A1 | 5/2008 | Kundu et al. |
| 2008/0150890 A1 | 6/2008 | Bell et al. |
| 2008/0150913 A1 | 6/2008 | Bell et al. |
| 2008/0170776 A1 | 7/2008 | Albertson et al. |
| 2008/0236902 A1 | 10/2008 | Imaizumi |
| 2008/0252596 A1 | 10/2008 | Bell et al. |
| 2008/0256494 A1 | 10/2008 | Greenfield |
| 2008/0260250 A1 | 10/2008 | Vardi |
| 2008/0281583 A1 | 11/2008 | Slothouber et al. |
| 2008/0287189 A1 | 11/2008 | Rabin |
| 2009/0009593 A1 | 1/2009 | Cameron et al. |
| 2009/0027335 A1 | 1/2009 | Ye |
| 2009/0027337 A1 | 1/2009 | Hildreth |
| 2009/0031240 A1 | 1/2009 | Hildreth |
| 2009/0033623 A1 | 2/2009 | Lin |
| 2009/0040215 A1 | 2/2009 | Afzulpurkar et al. |
| 2009/0073117 A1 | 3/2009 | Tsurumi et al. |
| 2009/0077504 A1 | 3/2009 | Bell |
| 2009/0078473 A1 | 3/2009 | Overgard et al. |
| 2009/0083122 A1 | 3/2009 | Angell et al. |
| 2009/0083622 A1 | 3/2009 | Chien et al. |
| 2009/0096783 A1 | 4/2009 | Shpunt et al. |
| 2009/0183125 A1 | 7/2009 | Magal et al. |
| 2009/0195392 A1 | 8/2009 | Zalewski |
| 2009/0228841 A1 | 9/2009 | Hildreth |
| 2009/0256817 A1 | 10/2009 | Perlin et al. |
| 2009/0284542 A1 | 11/2009 | Baar et al. |
| 2009/0297028 A1 | 12/2009 | De Haan |
| 2010/0002936 A1 | 1/2010 | Khomo et al. |
| 2010/0007717 A1 | 1/2010 | Spektor et al. |
| 2010/0034457 A1 | 2/2010 | Berliner et al. |
| 2010/0036717 A1 | 2/2010 | Trest |
| 2010/0053151 A1 | 3/2010 | Marti et al. |
| 2010/0053304 A1 | 3/2010 | Underkoffler et al. |
| 2010/0071965 A1 | 3/2010 | Hu et al. |
| 2010/0083189 A1 | 4/2010 | Arlein et al. |
| 2010/0095773 A1* | 4/2010 | Shaw ............... G06F 3/0346 73/514.31 |
| 2010/0103106 A1 | 4/2010 | Chui |
| 2010/0149096 A1 | 6/2010 | Migos et al. |
| 2010/0164897 A1 | 7/2010 | Morin et al. |
| 2010/0177933 A1 | 7/2010 | Willmann et al. |
| 2010/0199228 A1 | 8/2010 | Latta et al. |
| 2010/0199231 A1 | 8/2010 | Markovic et al. |
| 2010/0229125 A1 | 9/2010 | Cha |
| 2010/0234094 A1 | 9/2010 | Gagner et al. |
| 2010/0235034 A1 | 9/2010 | Higgins |
| 2010/0235786 A1 | 9/2010 | Maizels et al. |
| 2010/0295781 A1 | 11/2010 | Alameh et al. |
| 2011/0006978 A1 | 1/2011 | Yuan |
| 2011/0007035 A1 | 1/2011 | Shai |
| 2011/0018795 A1 | 1/2011 | Jang |
| 2011/0029918 A1 | 2/2011 | Yoo et al. |
| 2011/0052006 A1 | 3/2011 | Gurman et al. |
| 2011/0081072 A1 | 4/2011 | Kawasaki et al. |
| 2011/0087970 A1 | 4/2011 | Swink et al. |
| 2011/0141053 A1 | 6/2011 | Bulea et al. |
| 2011/0144543 A1 | 6/2011 | Tsuzuki et al. |
| 2011/0164032 A1 | 7/2011 | Shadmi |
| 2011/0164141 A1 | 7/2011 | Tico et al. |
| 2011/0193939 A1 | 8/2011 | Vassigh et al. |
| 2011/0205186 A1 | 8/2011 | Newton et al. |
| 2011/0211044 A1 | 9/2011 | Shpunt et al. |
| 2011/0211754 A1 | 9/2011 | Litvak et al. |
| 2011/0225536 A1 | 9/2011 | Shams et al. |
| 2011/0227820 A1 | 9/2011 | Haddick et al. |
| 2011/0231757 A1 | 9/2011 | Haddick et al. |
| 2011/0242102 A1 | 10/2011 | Hess |
| 2011/0248914 A1 | 10/2011 | Sherr |
| 2011/0254765 A1 | 10/2011 | Brand |
| 2011/0254798 A1 | 10/2011 | Adamson et al. |
| 2011/0260965 A1 | 10/2011 | Kim et al. |
| 2011/0261058 A1 | 10/2011 | Luo |
| 2011/0279397 A1 | 11/2011 | Rimon et al. |
| 2011/0291926 A1 | 12/2011 | Gokturk et al. |
| 2011/0292036 A1 | 12/2011 | Sali et al. |
| 2011/0293137 A1 | 12/2011 | Gurman et al. |
| 2011/0296353 A1 | 12/2011 | Ahmed et al. |
| 2011/0310010 A1 | 12/2011 | Hoffnung et al. |
| 2012/0001875 A1 | 1/2012 | Li et al. |
| 2012/0035934 A1 | 2/2012 | Cunningham |
| 2012/0038550 A1 | 2/2012 | Lemmey et al. |
| 2012/0078614 A1 | 3/2012 | Galor et al. |
| 2012/0089950 A1* | 4/2012 | Tseng ............... G06F 3/0484 715/854 |
| 2012/0117514 A1 | 5/2012 | Kim et al. |
| 2012/0124516 A1 | 5/2012 | Friedman |
| 2012/0169583 A1 | 7/2012 | Rippel et al. |
| 2012/0173067 A1 | 7/2012 | Szczerba et al. |
| 2012/0200494 A1* | 8/2012 | Perski ............... G06F 3/017 345/156 |
| 2012/0202569 A1 | 8/2012 | Maizels et al. |
| 2012/0204133 A1 | 8/2012 | Guendelman et al. |
| 2012/0223882 A1 | 9/2012 | Galor et al. |
| 2012/0249416 A1 | 10/2012 | Maciocci et al. |
| 2012/0268369 A1 | 10/2012 | Kikkeri |
| 2012/0275680 A1 | 11/2012 | Omi |
| 2012/0295661 A1 | 11/2012 | Kim et al. |
| 2012/0309535 A1* | 12/2012 | Langridge ............... G06F 3/011 463/39 |
| 2012/0313848 A1 | 12/2012 | Galor et al. |
| 2012/0320080 A1 | 12/2012 | Giese et al. |
| 2013/0002801 A1 | 1/2013 | Mock |
| 2013/0014052 A1 | 1/2013 | Frey et al. |
| 2013/0044053 A1 | 2/2013 | Galor et al. |
| 2013/0055120 A1 | 2/2013 | Galor et al. |
| 2013/0055150 A1 | 2/2013 | Galor |
| 2013/0058565 A1 | 3/2013 | Rafii et al. |
| 2013/0106692 A1 | 5/2013 | Maizels et al. |
| 2013/0107021 A1 | 5/2013 | Maizels et al. |
| 2013/0127854 A1 | 5/2013 | Shpunt et al. |
| 2013/0155070 A1 | 6/2013 | Luo |
| 2013/0207920 A1 | 8/2013 | McCann et al. |
| 2013/0222239 A1 | 8/2013 | Galor |
| 2013/0263036 A1* | 10/2013 | Berenson ............... G06F 3/017 715/773 |
| 2013/0265222 A1 | 10/2013 | Berenson et al. |
| 2013/0283208 A1 | 10/2013 | Bychkov et al. |
| 2013/0283213 A1 | 10/2013 | Bychkov et al. |
| 2014/0108930 A1 | 4/2014 | Asnis |

(56) References Cited

U.S. PATENT DOCUMENTS

| | | | |
|---|---|---|---|
| 2014/0237432 A1 | 8/2014 | Geurts et al. | |
| 2016/0026265 A1* | 1/2016 | Shaw | G06F 3/0346 345/158 |

FOREIGN PATENT DOCUMENTS

| | | | |
|---|---|---|---|
| WO | 2004107272 A1 | 12/2004 | |
| WO | 2005003948 A1 | 1/2005 | |
| WO | 2005094958 A1 | 10/2005 | |
| WO | 2007078639 A1 | 7/2007 | |
| WO | 2007135376 A2 | 11/2007 | |
| WO | 2012107892 A1 | 8/2012 | |

OTHER PUBLICATIONS

Bleiwess et al., "Markerless Motion Capture Using a Single Depth Sensor", SIGGRAPH Asia 2009, Yokohama, Japan, Dec. 16-19, 2009.

Bevilacqua et al., "People Tracking Using a Time-Of-Flight Depth Sensor", Proceedings of the IEEE International Conference on Video and Signal Based Surveillance, Sydney, Australia, Nov. 22-24, 2006.

Bradski, G., "Computer Vision Face Tracking for Use in a Perceptual User Interface", Intel Technology Journal, vol. 2, issue 2 (2nd Quarter 2008).

Comaniciu et al., "Kernel-Based Object Tracking", IEEE Transactions on Pattern Analysis and Machine Intelligence, vol. 25, No. 5, pp. 564-577, May 2003.

Gesturetec Inc., "Gesture Control Solutions for Consumer Devices", Canada, 2009.

Gokturk et al., "A Time-Of-Flight Depth Sensor—System Description, Issues and Solutions", Proceedings of the 2004 Conference on Computer Vision and Patter Recognition Workshop (CVPRW'04), vol. 3, pp. 35, Jun. 27-Jul. 2, 2004.

Grest et al., "Single View Motion Tracking by Depth and Silhouette Information", SCIA 2007—Scandinavian Conference on Image Analysis, Lecture Notes in Computer Science 4522, pp. 719-729, Aalborg, Denmark, Jun. 10-14, 2007.

Haritaoglu et al., "Ghost 3d: Detecting Body Posture and Parts Using Stereo", Proceedings of the IEEE Workshop on Motion and Video Computing (MOTION'02), pp. 175-180, Orlando, USA, Dec. 5-6, 2002.

Haritaoglu et al., "W4S : A real-time system for detecting and tracking people in 2<1/2>D", ECCV 98—5th European conference on computer vision, vol. 1407, pp. 877-892, Freiburg , Germany, Jun. 2-6, 1998.

Harville, M., "Stereo Person Tracking with Short and Long Term Plan-View Appearance Models of Shape and Color", Proceedings of the IEEE International Conference on Advanced Video and Signal-Based Surveillance (AVSSS-2005), pp. 522-527, Como, Italy, Sep. 15-16, 2005.

Holte, M., "Fusion of Range and Intensity Information for View Invariant Gesture Recognition", IEEE Conference on Computer Vision and Pattern Recognition Workshops (CVPRW '08), pp. 1-7, Anchorage, USA, Jun. 23-28, 2008.

Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.

Kolb et al., "ToF-Sensors: New Dimensions for Realism and Interactivity", Proceedings of the IEEE Conference on Computer Vision and Patter Recognition Workshops, pp. 1-6, Anchorage, USA, Jun. 23-28, 2008.

Kolsch et al. "Fast 2D Hand Tracking with Flocks of Features and Multi-Cue Integration", IEEE Workshop on Real-Time Vision for Human Computer Interaction (at CVPR'04), Washington, USA, Jun. 27-Jul. 2, 2004.

Krumm et al., "Multi-Camera Multi-Person Tracking for EasyLiving", 3rd IEEE International Workshop on Visual Surveillance, Dublin, Ireland, Jul. 1, 2000.

Leens et al., "Combining Color, Depth, and Motion for Video Segmentation", ICVS 2009—7th International Conference on Computer Vision Systems, Liege, Belgium Oct. 13-15, 2009.

MacCormick et al., "Partitioned Sampling, Articulated Objects, and Interface-Quality Hand Tracking", ECCV '00—Proceedings of the 6th European Conference on Computer Vision—Part II , pp. 3-19, Dublin, Ireland, Jun. 26-Jul. 1, 2000.

Malassiotis et al., "Real-Time Hand Posture Recognition Using Range Data", Image and Vision Computing, vol. 26, No. 7, pp. 1027-1037, Jul. 2, 2008.

Morano et al., "Structured Light Using Pseudorandom Codes", IEEE Transactions on Pattern Analysis and Machine Intelligence, vol. 20, issue 3, pp. 322-327, Mar. 1998.

Munoz-Salinas et al., "People Detection and Tracking Using Stereo Vision and Color", Image and Vision Computing, vol. 25, No. 6, pp. 995-1007, Jun. 1, 2007.

Nanda et al., "Visual Tracking Using Depth Data", Proceedings of the 2004 Conference on Computer Vision and Patter Recognition Workshop, vol. 3, Washington, USA, Jun. 27-Jul. 2, 2004.

Scharstein et al., "High-Accuracy Stereo Depth Maps Using Structured Light", IEEE Conference on Computer Vision and Patter Recognition, vol. 1, pp. 195-2002, Madison, USA, Jun. 2003.

Shi et al., "Good Features to Track", IEEE Conference on Computer Vision and Pattern Recognition, pp. 593-600, Seattle, USA, Jun. 21-23, 1994.

Siddiqui et al., "Robust Real-Time Upper Body Limb Detection and Tracking", Proceedings of the 4th ACM International Workshop on Video Surveillance and Sensor Networks, Santa Barbara, USA, Oct. 27, 2006.

Softkinetic S.A., IISU™—3D Gesture Recognition Platform for Developers of 3D Applications, Belgium, Brussels, 2007-2010.

Sudderth et al., "Visual Hand Tracking Using Nonparametric Belief Propagation", IEEE Workshop on Generative Model Based Vision at CVPR'04, Washington, USA, Jun. 27-Jul. 2, 2004.

Tsap, L. "Gesture-Tracking in Real Time with Dynamic Regional Range Computation", Real-Time Imaging, vol. 8, issue 2, pp. 115-126, Apr. 2002.

Xu et al., "A Multi-Cue-Based Human Body Tracking System", Proceedings of the 5ths International Conference on Computer Vision Systems (ICVS 2007), Germany, Mar. 21-24, 2007.

Xu et al., "Human Detecting Using Depth and Gray Images", Proceedings of the IEE Conference on Advanced Video and Signal Based Surveillance (AVSS'03), Miami, USA, Jul. 21-22, 2003.

Yilmaz et al., "Object Tracking: A Survey", ACM Computing Surveys, vol. 38, No. 4, article 13, Dec. 2006.

Zhu et al., "Controlled Human Pose Estimation From Depth Image Streams", IEEE Conference on Computer Vision and Patter Recognition Workshops, pp. 1-8, Anchorage, USA, Jun. 23-27, 2008.

International Application PCT/IB2010/051055 Search Report dated Sep. 1, 2010.

La Viola, J. Jr., "Whole-Hand and Speech Input in Virtual Environments", Computer Science Department, Florida Atlantic University, USA, 1996.

Martell, C., "Form: An Experiment in the Annotation of the Kinematics of Gesture", Dissertation, Computer and Information Science, University of Pennsylvania, 2005.

U.S. Appl. No. 12/352,622 Official Action dated Mar. 31, 2011.

Prime Sense Inc., "Prime Sensor™ NITE 1.1 Framework Programmer's Guide", Version 1.2, year 2009.

Primesense Corporation, "PrimeSensor Reference Design 1.08", USA, year 2010.

International Application PCT/IB2011/053192 Search Report dated Dec. 6, 2011.

U.S. Appl. No. 12/352,622 Official Action dated Sep. 30, 2011.

U.S. Appl. No. 12/683,452 Office Action dated Nov. 21, 2014.

U.S. Appl. No. 14/055,997 Office Action dated Nov. 21, 2014.

U.S. Appl. No. 13/592,352 Office Action dated Oct. 2, 2014.

Scharstein, D., "Stereo vision for view synthesis", Proceedings of IEEE Conference on Computer Vision and Pattern Recognition, pp. 852-858, year 1996.

Zhu et al., "Generation and Error Characterization of Pararell-Perspective Stereo Mosaics from Real Video", In-Video Registration, Springer, US, chapter 4,pp. 72-105, year 2003.

(56) References Cited

OTHER PUBLICATIONS

Chai et al., "Parallel Projections for Stereo Reconstruction", Proceedings of IEEE Conference on Computer Vision and Pattern Recognition ,vol. 2, pp. 493-500, year 2000.
Evers et al., "Image-based rendering of complex scenes from multi-camera rig", IEEE Proceedings on Vision, Image and Signal Processing, vol. 152, No. 4, pp. 470-480, Aug. 5, 2005.
Evers et al,. "Image-based Interactive rendering with view dependent geometry", Computer Graphics Forum, (Eurographics '03), vol. 22, No. 3, pp. 573-582, year 2003.
Kauff et al., "Depth map creation and image-based rendering for advanced 3DTV Services Providing Interoperability and Scalability", Signal Processing: Image Communication, vol. 22, No. 2, pp. 217-234, year 2007.
U.S. Appl. No. 13/161,508 Office Action dated Dec. 23, 2014.
U.S. Appl. No. 13/541,786 Office Action dated Feb. 13, 2014.
U.S. Appl. No. 13/584,831 Office Action dated Mar. 20, 2014.
U.S. Appl. No. 13/314,207 Office Action dated Apr. 3, 2014.
U.S. Appl. No. 12/683,452 Office Action dated Jan. 22, 2014.
U.S. Appl. No. 12/314,210 Office Action dated Jan. 10, 2014.
U.S. Appl. No. 13/592,352 Office Action dated Feb. 13, 2014.
Nakamura et al, "Occlusion detectable stereo-occlusion patterns in camera matrix", Proceedings of the 1996 Conference on Computer Vision and Pattern Recognition (CVPR '96), pp. 371-378, Jun. 1996.
U.S. Appl. No. 13/423,322 Office Action dated Apr. 7, 2014.
U.S. Appl. No. 13/592,352 Office Action dated May 7, 2014.
U.S. Appl. No. 12/721,582 Office Action dated Apr. 17, 2014.
U.S. Appl. No. 14/055,997 Office Action dated May 28, 2014.
U.S. Appl. No. 13/592,352 Office Action dated Jan. 29, 2015.
Gordon et al., "The use of Dense Stereo Range Date in Augmented Reality", Proceedings of the 1st International Symposium on Mixed and Augmented Reality (ISMAR), Darmstadt, Germany, pp. 1-10, Sep. 30-Oct. 1, 2002.
Agrawala et al., "The two-user Responsive Workbench :support for collaboration through individual views of a shared space", Proceedings on the 24th conference on computer graphics and interactive techniques (SIGGRAPH 97), Los Angeles, USA, pp. 327-332 , Aug. 3-8, 1997.
Harman et al., "Rapid 2D-to 3D conversion", Proceedings of SPIE Conference on Stereoscopic Displays and Virtual Reality Systems, vol. 4660, pp. 78-86, Jan. 21-23, 2002.
Hoff et al., "Analysis of head pose accuracy in augmented reality", IEEE Transactions on Visualization and Computer Graphics, vol. 6, No. 4, pp. 319-334, Oct.-Dec. 2000.
Poupyrev et al., "The go-go interaction technique: non-liner mapping for direct manipulation in VR", Proceedings of the 9th annual ACM Symposium on User interface software and technology (UIST '96), Washington, USA, pp. 79-80, Nov. 6-8, 1996.
Wexelblat et al., "Virtual Reality Applications and Explorations", Academic Press Inc., San Diego, USA, 262 pages, year 1993.
U.S. Appl. No. 13/161,508 Office Action dated Apr. 10, 2013.
U.S. Appl. No. 12/683,452 Office Action dated Jun. 7, 2013.
Miller, R., "Kinect for XBox 360 Review", Engadget, Nov. 4, 2010.
U.S. Appl. No. 13/161,508 Office Action dated Sep. 9, 2013.
International Application PCT/IB20131052332 Search Report dated Aug. 26, 2013.
U.S. Appl. No. 13/314,210 Office Action dated Jul. 19, 2013.
U.S. Appl. No. 13/314,207 Office Action dated Aug. 5, 2013.
Sun et al., "SRP Based Natural Interaction Between Real and Virtual Worlds in Augmented Reality", Proceedings of the International Conference on Cyberworlds (CW'08), pp. 117-124, Sep. 22-24, 2008.
Schmalstieg et al., "The Studierstube Augmented Reality Project", Presence: Teleoperators and Virtual Environments, vol. 11, No. 1, pp. 33-54, Feb. 2002.
Ohta et al., "Share-Z: Client/Server Depth Sensing for See-Through Head-Mounted Displays", Presence: Teleoperators and Virtual Environments, vol. 11, No. 2, pp. 176-188, Apr. 2002.
Gobbetti et al., "VB2: an Architecture for Interaction in Synthetic Worlds", Proceedings of the 6th Annual ACM Symposium on User Interface Software and Technology (UIST'93), pp. 167-178, Nov. 3-5, 1993.
Gargallo et al., "Bayesian 3D Modeling from Images Using Multiple Depth Maps", Proceedings of the IEEE Computer Society Conference on Computer Vision and Pattern Recognition (CVPR'05), vol. 2, pp. 885-891, Jun. 20-25, 2005.
Zrro Ltd., "TeleTouch Device", year 2011 (http://www.zrro.com/products.html).
Berliner et al., U.S. Appl. No. 61/732,354, filed Dec. 12, 2012.
Shpunt et al., U.S. Appl. No. 61/764,554, filed Feb. 14, 2013.
Hart, D., U.S. Appl. No. 09/616,606 "Method and System for High Resolution , Ultra Fast 3-D Imaging" filed Jul. 14, 2000.
International Application PCT/IL2007/000306 Search Report dated Oct. 2, 2008.
International Application PCT/IL2007/000574 Search Report dated Sep. 10, 2008.
International Application PCT/IL2006/000335 Preliminary Report on Patentability dated Apr. 24, 2008.
Avidan et al., "Trajectory triangulation: 3D reconstruction of moving points from amonocular image sequence", IEEE Transactions on Pattern Analysis and Machine Intelligence (PAMI), vol. 22, No. 4, pp. 348-3537, Apr. 2000.
LeClerc et al., "The direct computation of height from shading", The Proceedings of the IEEE Computer Society Conference on Computer Vision and Pattern Recognition (CVPR), pp. 552-558, USA, Jun. 1991.
Zhang et al., "Shape from intensity gradient", IEEE Transactions on Systems, Man and Cybernetics—Part A: Systems and Humans, vol. 29, No. 3, pp. 318-325, May 1999.
Zhang et al., "Height recovery from intensity gradients", IEEE Computer Society Conference on Computer Vision and Pattern Recognition (CVPR), pp. 508-513, Jun. 21-23, 1994.
Horn, B., "Height and gradient from shading", International Journal of Computer Vision, vol. 5, No. 1, pp. 37-76, Aug. 1990.
Bruckstein, A., "On shape from shading", Computer Vision, Graphics & Image Processing, vol. 44, pp. 139-154, year 1988.
Zhang et al., "Rapid Shape Acquisition Using Color Structured Light and Multi-Pass Dynamic Programming", 1st International Symposium on 3D Data Processing Visualization and Transmission (3DPVT), Italy, Jul. 2002.
Besl, P., "Active, Optical Range Imaging Sensors", Machine vision and applications, vol. 1, pp. 127-152, year 1988.
Horn et al., "Toward optimal structured light patterns", Proceedings of International Conference on Recent Advances in 3D Digital Imaging and Modeling, pp. 28-37, Ottawa, Canada, May 1997.
Goodman, J.W., "Statistical Properties of Laser Speckle Patterns", Laser Speckle and Related Phenomena, pp. 9-75, Springer-Verlag, Berlin Heidelberg, 1975.
Asada et al., "Determining Surface Orientation by Projecting a Stripe Pattern", IEEE Transactions on Pattern Analysis and Machine Intelligence (PAMI), vol. 10, No. 5, pp. 749-754, Sep. 1988.
Winkelbach et al., "Shape from Single Stripe Pattern Illumination", Luc Van Gool (Editor), (DAGM 2002), Lecture Notes in Computer Science 2449, p. 240-247, Springer 2002.
Koninckx et al., "Efficient, Active 3D Acquisition, based on a Pattern-Specific Snake", Luc Van Gool (Editor), (DAGM 2002), Lecture Notes in Computer Science 2449, pp. 557-565, Springer 2002.
Kimmel et al., "Analyzing and synthesizing images by evolving curves with the Osher-Sethian method", International Journal of Computer Vision, vol. 24, No. 1, pp. 37-56, year 1997.
Zigelman et al., "Texture mapping using surface flattening via multi-dimensional scaling", IEEE Transactions on Visualization and Computer Graphics, vol. 8, No. 2, pp. 198-207, Apr. 2002.
Dainty, J.C., "Introduction", Laser Speckle and Related Phenomena, pp. 1-7, Springer-Verlag, Berlin Heidelberg, 1975.
Mendlovic et al., "Composite harmonic filters for scale, projection and shift invariant pattern recognition", Applied Optics Journal, vol. 34, No. 2, Jan. 10, 1995.
Fua et al., "Human Shape and Motion Recovery Using Animation Models", 19th Congress, International Society for Photogrammetry and Remote Sensing, Amsterdam, The Netherlands, Jul. 2000.

(56) References Cited

OTHER PUBLICATIONS

Allard et al., "Marker-less Real Time 3D modeling for Virtual Reality", Immersive Projection Technology, Iowa State University, year 2004.
Howe et al., "Bayesian Reconstruction of 3D Human Motion from Single-Camera Video", Advanced in Neural Information Processing Systems, vol. 12, pp. 820-826, USA 1999.
Li et al., "Real-Time 3D Motion Tracking with Known Geometric Models", Real-Time Imaging Journal, vol. 5, pp. 167-187, Academic Press 1999.
Grammalidis et al., "3-D Human Body Tracking from Depth Images Using Analysis by Synthesis", Proceedings of the IEEE International Conference on Image Processing (ICIP2001), pp. 185-188, Greece, Oct. 7-10, 2001.
Segen et al., "Shadow gestures: 3D hand pose estimation using a single camera", Proceedings of IEEE International Conference on Computer Vision and Pattern Recognition, pp. 479-485, Fort Collins, USA, 1999.
Vogler et al., "ASL recognition based on a coupling between HMMs and 3D motion analysis", Proceedings of IEEE International Conference on Computer Vision, pp. 363-369, Mumbai, India, 1998.
Nam et al., "Recognition of Hand Gestures with 3D, Nonlinear Arm Movements", Pattern Recognition Letters, vol. 18, No. 1, pp. 105-113, Elsevier Science B.V. 1997.
Nesbat, S., "A System for Fast, Full-Text Entry for Small Electronic Devices", Proceedings of the 5th International Conference on Multimodal Interfaces, ICMI 2003, Vancouver, Nov. 5-7, 2003.
Ascension Technology Corporation, "Flock of Birds: Real-Time Motion Tracking", 2008.
Segen et al., "Human-computer interaction using gesture recognition and 3D hand tracking", ICIP 98, Proceedings of the IEEE International Conference on Image Processing, vol. 3, pp. 188-192, Oct. 4-7, 1998.
Dekker, L., "Building Symbolic Information for 3D Human Body Modeling from Range Data", Proceedings of the Second International Conference on 3D Digital Imaging and Modeling, IEEE computer Society, pp. 388-397, 1999.
Holte et al., "Gesture Recognition using a Range Camera", Technical Report CVMT-07-01 ISSN 1601-3646, Feb. 2007.
Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, 2007.
Microvision Inc., "PicoP® Display Engine—How it Works", 1996-2012.
Primesense Corporation, "PrimeSensor NITE 1.1", USA, year 2010.
Arm Ltd., "AMBA Specification: AHB", Version 2, pp. 35-92, year 1999.
Commission Regulation (EC) No. 1275/2008, Official Journal of the European Union, Dec. 17, 2008.
Primesense, "Natural Interaction", YouTube Presentation, Jun. 9, 2010 http://www.youtube.com/watch?v=TzLKsex43zl~.
Manning et al., "Foundations of Statistical Natural Language Processing", chapters 6,7,9 and 12, MIT Press 1999.
U.S. Appl. No. 12/762,336 Official Action dated May 15, 2012.
Tobii Technology, "The World Leader in Eye Tracking and Gaze Interaction", Mar. 2012.
Noveron, "Madison video eyewear", year 2012.
International Application PCT/IB2012/050577 Search Report dated Aug. 6, 2012.
U.S. Appl. No. 12/683,452 Official Action dated Sep. 7, 2012.
Koutek, M., "Scientific Visualization in Virtual Reality: Interaction Techniques and Application Development", PhD Thesis, Delft University of Technology, 264 pages, Jan. 2003.
Azuma et al., "Recent Advances in Augmented Reality", IEEE Computer Graphics and Applications, vol. 21, issue 6, pp. 34-47, Nov. 2001.
Breen et al., "Interactive Occlusion and Collision of Real and Virtual Objects in Augmented Reality", Technical Report ECRC-95-02, ECRC, Munich, Germany, 22 pages, year 1995.
Burdea et al., "A Distributed Virtual Environment with Dextrous Force Feedback", Proceedings of Interface to Real and Virtual Worlds Conference, pp. 255-265, Mar. 1992.
U.S. Appl. No. 13/244,490 Office Action dated Dec. 6, 2013.
U.S. Appl. No. 13/423,314 Office Action dated Dec. 4, 2013.
U.S. Appl. No. 13/423,322 Office Action dated Nov. 1, 2013.
U.S. Appl. No. 13/584,831 Office Action dated Jul. 8, 2014.
U.S. Appl. No. 13/423,314 Office Action dated Jul. 31, 2014.
U.S. Appl. No. 12/683,452 Office Action dated Jul. 16, 2014.
U.S. Appl. No. 13/423,314 Advisory Action dated Jun. 26, 2014.
Slinger et al, "Computer—Generated Holography as a Generic Display Technology", IEEE Computer, vol. 28, Issue 8, pp. 46-53, Aug. 2005.
Hilliges et al, "Interactions in the air: adding further depth to interactive tabletops", Proceedings of the 22nd annual ACM symposium on User interface software and technology, ACM, pp. 139-148, Oct. 2009.
U.S. Appl. No. 13/161,508 Office Action dated Aug. 18, 2015.
U.S. Appl. No. 13/904,052 Office Action dated Oct. 14, 2015.
Bailly et al., "Gesture-aware remote controls: guidelines and interaction technique", Proceedings of the 13th international conference on multimodal interfaces, pp. 263-270, 2011.

\* cited by examiner

ZOOM-BASED GESTURE USER INTERFACE

CROSS-REFERENCE TO RELATED APPLICATIONS

This application is a continuation-in-part of U.S. patent application Ser. No. 13/541,786, filed Jul. 5, 2012, which claims the benefit of U.S. Provisional Patent Application 61/504,339, filed Jul. 5, 2011, of U.S. Provisional Patent Application 61/521,448, filed Aug. 9, 2011, and of U.S. Provisional Patent Application 61/523,349, filed Aug. 14, 2011. This application also claims the benefit of U.S. Provisional Patent Application 61/652,899, filed May 30, 2012. All of the above related applications are incorporated herein by reference.

FIELD OF THE INVENTION

This invention relates generally to user interfaces for computerized systems, and specifically to user interfaces that are based on three-dimensional sensing.

BACKGROUND

Many different types of user interface devices and methods are currently available. Common tactile interface devices include the computer keyboard, mouse and joystick. Touch screens detect the presence and location of a touch by a finger or other object within the display area. Infrared remote controls are widely used, and "wearable" hardware devices have been developed, as well, for purposes of remote control.

Computer interfaces based on three-dimensional (3D) sensing of parts of the user's body have also been proposed. For example, PCT International Publication WO 03/071410, whose disclosure is incorporated herein by reference, describes a gesture recognition system using depth-perceptive sensors. A 3D sensor provides position information, which is used to identify gestures created by a body part of interest. The gestures are recognized based on a shape of a body part and its position and orientation over an interval. The gesture is classified for determining an input into a related electronic device.

As another example, U.S. Pat. No. 7,348,963, whose disclosure is incorporated herein by reference, describes an interactive video display system, in which a display screen displays a visual image, and a camera captures 3D information regarding an object in an interactive area located in front of the display screen. A computer system directs the display screen to change the visual image in response to changes in the object.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY

There is provided, in accordance with an embodiment of the present invention a method, including arranging, by a computer, multiple interactive objects as a hierarchical data structure, each node of the hierarchical data structure associated with a respective one of the multiple interactive objects, presenting, on a display coupled to the computer, a first subset of the multiple interactive objects that are associated with one or more child nodes of one of the multiple interactive objects, receiving a sequence of three-dimensional (3D) maps including at least part of a hand of a user positioned in proximity to the display, identifying, in the sequence of three-dimensional (3D) maps, the hand performing a transverse gesture followed by a grab gesture followed by a longitudinal gesture followed by an execute gesture, selecting, in response to the transverse gesture, an object from the first subset of the multiple interactive objects, and performing, in response to the grab gesture, the longitudinal gesture and the execute gesture, an operation associated with the selected object.

There is also provided, in accordance with an embodiment of the present invention an apparatus, including a sensing device, a display, and a computer coupled to the sensing device and the display, and configured to arrange multiple interactive objects as a hierarchical data structure, each node of the hierarchical data structure associated with a respective one of the multiple interactive objects, to present, on the display, a first subset of the multiple interactive objects that are associated with one or more child nodes of one of the multiple interactive objects, to receive a sequence of three-dimensional (3D) maps including at least part of a hand of a user positioned in proximity to a display coupled to the computer, to identify, in the sequence of three-dimensional (3D) maps, the hand performing a transverse gesture followed by a grab gesture followed by a longitudinal gesture followed by an execute gesture, to select, in response to the transverse gesture, one of the first subset of the multiple interactive objects, and to perform, in response to the grab gesture, the longitudinal and the execute gesture, an operation associated with the selected one of the first subset of the multiple interactive objects.

There is further provided, in accordance with an embodiment of the present invention a computer software product, including a non-transitory computer-readable medium, in which program instructions are stored, which instructions, when read by a computer, cause the computer to arrange multiple interactive objects as a hierarchical data structure, each node of the hierarchical data structure associated with a respective one of the multiple interactive objects, to present, on a display, a first subset of the multiple interactive objects that are associated with one or more child nodes of one of the multiple interactive objects, to receive a sequence of three-dimensional (3D) maps including at least part of a hand of a user positioned in proximity to a display coupled to the computer, to identify, in the sequence of three-dimensional (3D) maps, the hand performing a transverse gesture followed by a grab gesture followed by a longitudinal gesture followed by an execute gesture, to select, in response to the transverse gesture, one of the first subset of the multiple interactive objects, and to perform, in response to the execute gesture, the longitudinal and the execute gesture, an operation associated with the selected one of the first subset of the multiple interactive objects.

BRIEF DESCRIPTION OF THE DRAWINGS

The disclosure is herein described, by way of example only, with reference to the accompanying drawings, wherein.

DETAILED DESCRIPTION OF EMBODIMENTS

When using physical tactile input devices such as buttons, rollers or touch screens, a user typically engages and disengages control of a user interface by touching and/or manipulating the physical device. Embodiments of the present invention provide methods and mechanisms for interacting with a display coupled to a computer executing a non-tactile zoom-based user interface that includes three-dimensional (3D) sensing, by a 3D sensor, of motion or change of position of one or more body parts, typically a hand or a finger, of the user.

In some embodiments the zoom-based user interface utilizes a ZoomGrid control scheme that enables the user to select a given interactive object from multiple interactive objects presented on a display. The ZoomGrid control scheme described hereinbelow utilizes a hierarchical data structure having multiple levels with multiple nodes, wherein non-leaf nodes may represent categories (e.g., movies and music), for example, while leaf nodes represent content (e.g., media files and software applications).

Using embodiments described herein, a user can perform 3D gestures to traverse the hierarchical data structure in order to find a specific node storing content and perform an operation on the content. In some embodiments, if the content comprises a movie, the user can perform 3D gestures to manipulate on-screen media controls for operations such as volume control, pause, seek, etc. In additional embodiments of the present invention, the user can perform 3D gestures to enter text via an on-screen keyboard, and point to areas just outside a display to select "hidden icons".

When interacting with a computer executing a non-tactile zoom-based user interface, a user may be positioned so that both of the user's hands are positioned within a field of view of a 3D optical sensor coupled to the computer. Additionally, there may be more than one user positioned within the sensor's field of view. In embodiments of the present invention, the computer can analyze a position of each hand within the field of view, and identify which of the hands is most likely intentionally interacting with the non-tactile user interface by performing 3D gestures.

System Description

Figure 1:
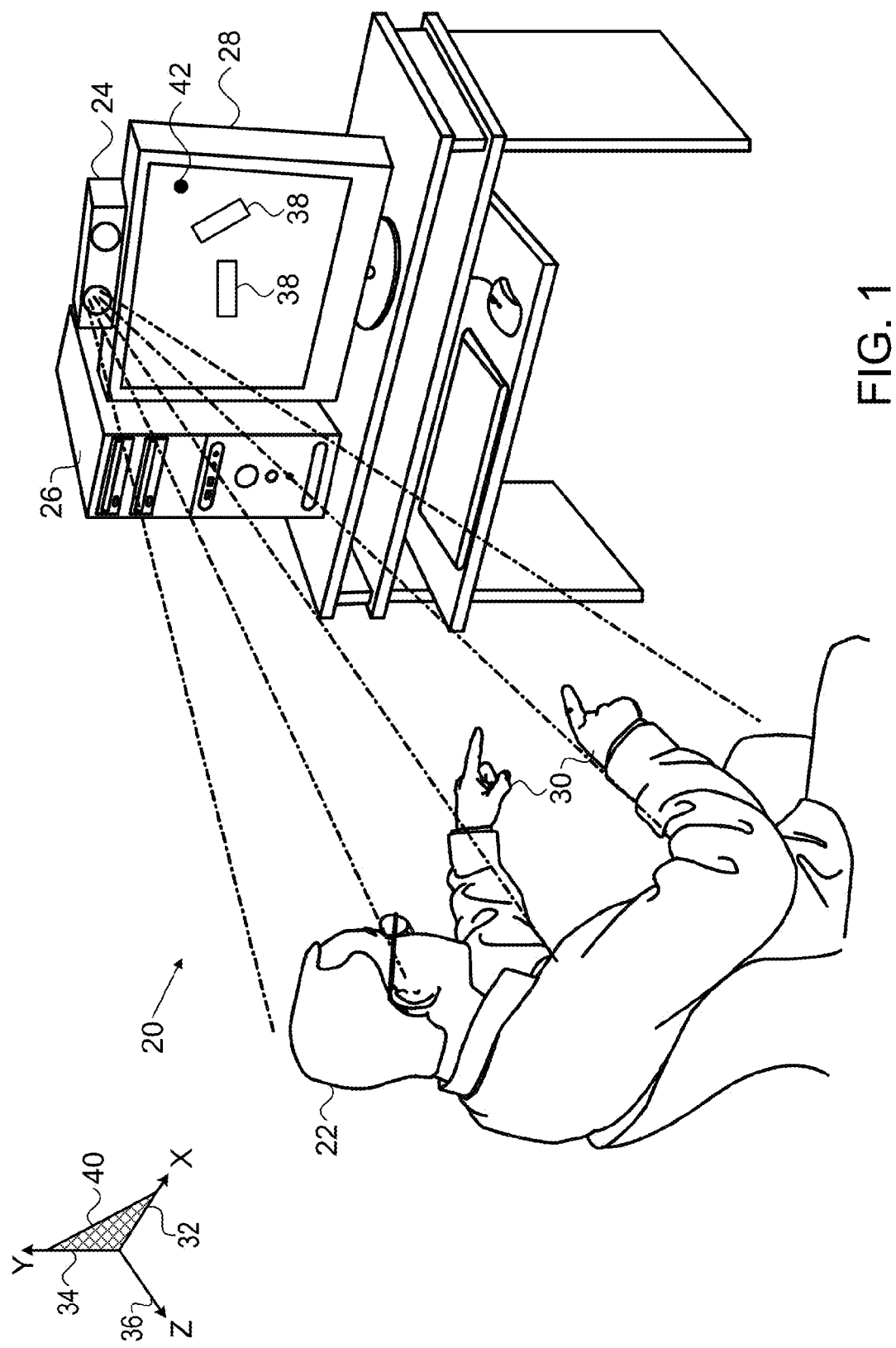
FIG. 1 is a schematic, pictorial illustration of a computer system implementing a non-tactile zoom-based user interface, in accordance with an embodiment of the present invention.

FIG. 1 is a schematic, pictorial illustration of a non-tactile zoom-based interface 20 (also referred to herein as the Zoom-Grid interface) for operation by a user 22 of a computer 26, in accordance with an embodiment of the present invention. The non-tactile zoom-based interface is based on a 3D sensing device 24 coupled to the computer, which captures 3D scene information of a scene that includes the body (or at least a body part, such as one or more of hands 30) of the user. Device 24 or a separate camera (not shown in the figures) may also capture video images of the scene. The information captured by device 24 is processed by computer 26, which drives a display 28 so as to present and manipulate on-screen interactive objects 38. Details of the operation of one appropriate type of 3D sensing device 24 are described in U.S. Patent Application Publication 2010/0007717, whose disclosure is incorporated herein by reference.

Computer 26, executing zoom-based interface 20, processes data generated by device 24 in order to reconstruct a 3D map of user 22. The term "3D map" refers to a set of 3D coordinates measured, by way of example, with reference to a generally horizontal X-axis 32 in space, a generally vertical Y-axis 34 in space and a depth Z-axis 36 in space, based on device 24. The 3D coordinates represent the surface of a given object, in this case the user's body. In embodiments described below, as user 22 moves hand 30 along Z-axis 36 and an X-Y plane 40, computer 26 is configured to process the inputs received from the user in order to control location of a cursor 42 presented on display 28. The Z-direction, i.e., the direction perpendicular to the plane of display 28, is referred to in the present description and in the claims as the longitudinal direction, while directions within an X-Y plane, parallel to the plane of display, are referred to as transverse directions.

In one embodiment, device 24 projects a pattern of spots onto the object and captures an image of the projected pattern. Computer 26 then computes the 3D coordinates of points on the surface of the user's body by triangulation, based on transverse shifts of the spots in the pattern. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, interface 20 may use other methods of 3D mapping, using single or multiple cameras or other types of sensors, as are known in the art.

Computer 26 typically comprises a general-purpose computer processor, which is programmed in software to carry out the functions described hereinbelow. The software may be downloaded to the processor in electronic form, over a network, for example, or it may alternatively be provided on non-transitory tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although computer 26 is shown in FIG. 1, by way of example, as a separate unit from sensing device 24, some or all of the processing functions of the computer may be performed by suitable dedicated circuitry within the housing of the sensing device or otherwise associated with the sensing device.

As another alternative, these processing functions may be carried out by a suitable processor that is integrated with display 28 (in a television set, for example) or with any other suitable sort of computerized device, such as a game console or media player. The sensing functions of device 24 may likewise be integrated into the computer or other computerized apparatus that is to be controlled by the sensor output.

Zoomgrid Surfaces

Figure 2:
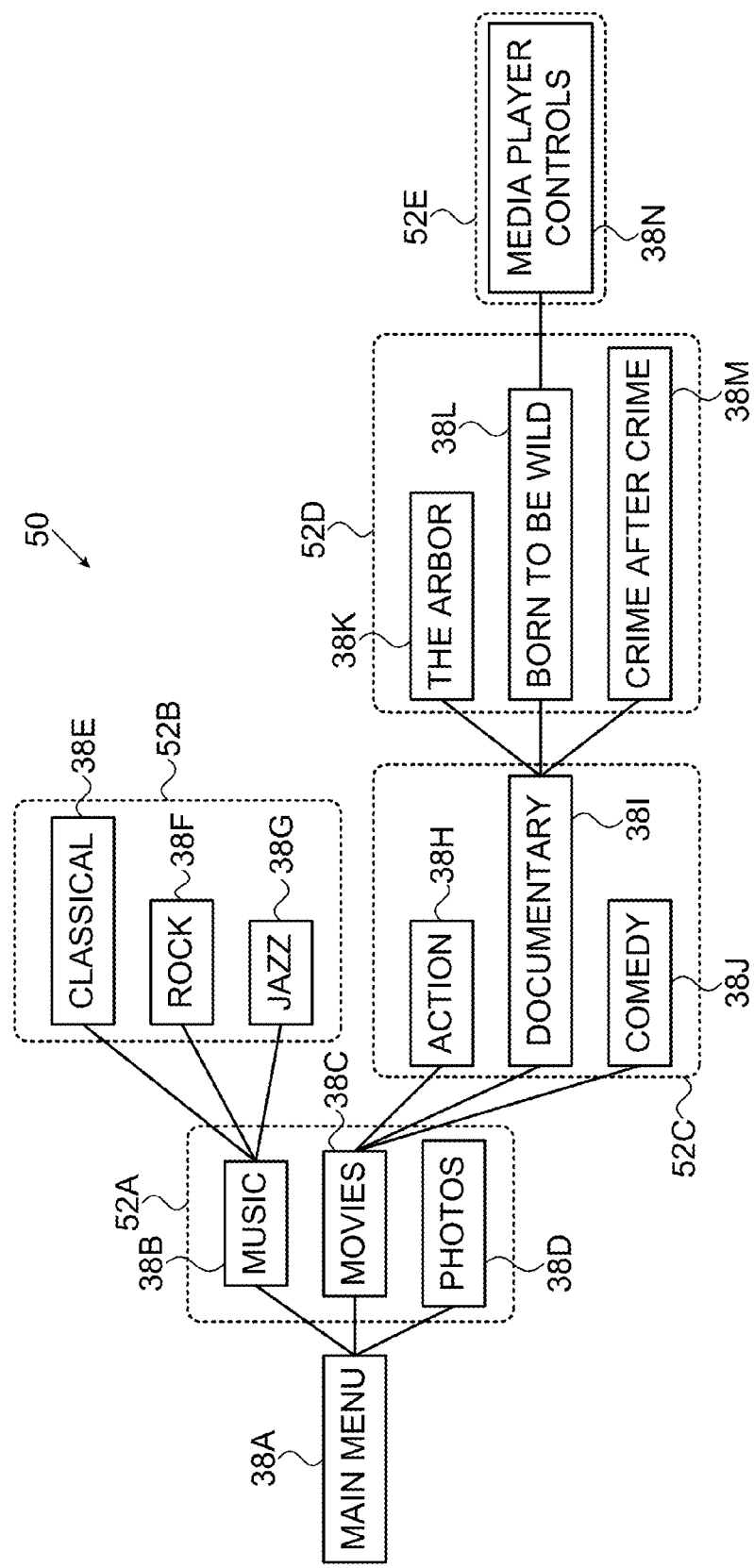
FIG. 2 is an schematic illustration of a tree data structure that the computer can present as a series of hierarchical ZoomGrid surfaces, in accordance with an embodiment of the present invention.

FIG. 2 is an schematic illustration of a hierarchical data structure 50 (also referred to herein as a tree) that computer 26 can present as a series of hierarchical ZoomGrid surfaces 52, in accordance with an embodiment of the present invention. Each of the ZoomGrid surfaces comprises one or more interactive objects 38. In the description herein, interactive objects 38 may be differentiated by appending a letter to the identifying numeral, so that interactive objects 38 comprise interactive objects 38A-38N, and surfaces 52 may be differentiated by appending a letter to the identifying numeral so that surface 52 comprise surfaces 52A-52E.

In operation, as user 22 traverses tree 50 and accesses a given interactive object 38, computer 26 presents a given ZoomGrid surface 52 comprising sub-objects 38 (i.e., children nodes in tree 50) of the given interactive object. In the example shown in FIG. 2, the sub-objects can comprise menus, media objects or media player controls.

As described hereinbelow, starting from a given surface 52, user 22 can traverse data structure 50 toward a given interactive object 38 (e.g., interactive object 38L) by performing a Find gesture (also referred to herein as a Transverse gesture), followed by a Grab gesture, a Pull Gesture and a Release gesture. Likewise, starting from the given surface, user 22 can traverse data structure 50 toward root interactive object 38A by performing a Find gesture, followed by a Grab gesture, a Push Gesture and a Release gesture. The terms grab, push and release are used in the present description and in the claims in their literal senses, to describe hand motions that would be used to graph, push and release a physical object, respectively, although in embodiments of the present invention these gestures are generally performed with respect to an interactive object, without there being any actual physical object in the hand.

Figure 3:
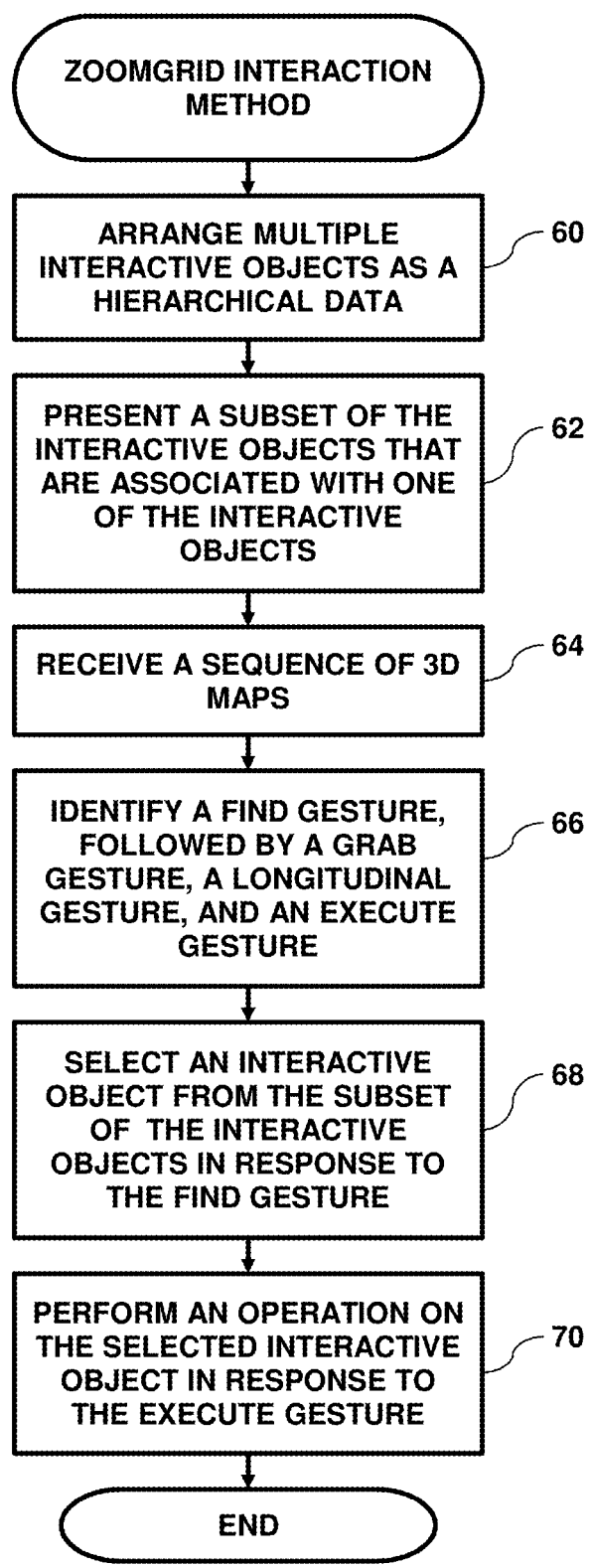
FIG. 3 is a flow diagram that schematically illustrates a method of interacting with the ZoomGrid surfaces, in accordance with an embodiment of the present invention.

FIG. 3 is a flow diagram that illustrates a method of interacting with ZoomGrid surfaces 52, in accordance with an embodiment of the present invention. In an initialization step 60, computer 26 arranges multiple interactive objects 38 as hierarchical data structure 50, wherein each node of the hierarchical data structure is associated with a respective one of the multiple interactive objects.

In a presentation step 62, computer 26 presents, on display 28, a subset (i.e., a given surface 52) of interactive objects 38 that are associated with one or more child nodes of a first interactive object 38. As described supra, user 22 traverses tree 50 by accessing a given interactive object 38. Therefore, when initiating an interaction with ZoomGrid surfaces 52, user initially accesses interactive object 38A, and computer 26 presents interactive objects 38B, 38C and 38D. Using embodiments described herein, user 22 can then traverse tree 50.

In a receive step 64, computer 26 receives, from sensing device 24, a sequence of 3D maps that include at least a part of hand 30 positioned in proximity to display 28, and in an identification step 66, the computer identifies, in the sequence of 3D maps, a Find gesture followed by a Grab gesture followed by a longitudinal gesture followed by an Execute gesture. The term Execute gesture is used in the present description and in the claims in their literal senses, to describe a hand motion that user 22 performs subsequent to the longitudinal gesture in order to instruct computer 26 to perform an operation on a selected interactive object 38.

Examples of the Execute gesture include:
  A time delay. The user can keep hand 30 steady for at least a specific time period. Keeping hand 30 steady for at least a specific period of time is also referred to as a TimeClick gesture, which is described in U.S. Patent Application Publication 2013/0044053, whose disclosure is incorporated herein by reference.
  Perform a Release gesture. If the user pulls hand 30 back, the glass door stays "closed" until the user opens his hand.
  Break on panning. If the user starts "swiping" hand 30 to the left or the right (i.e., a Find gesture), the glass door opens, and the computer scrolls data the presented interactive objects in a direction of the swiping motion.

The Find gesture is described in U.S. Patent Application Publication 2012/0223882, whose disclosure is incorporated herein by reference. To perform the Find gesture, user 22 moves hand 30 along X-Y plane 40, and computer 26 can position cursor 42 on display 28 in response to the motion of the hand.

The Grab and the Release gestures are described in U.S. Patent Application Publication 2012/0204133, whose disclosure is incorporated herein by reference. To perform the Grab gesture, user 22 closed hand 30 by folding one or more fingers of hand 30 toward a palm of the hand. To perform the Release gesture, user 22 opens hand 30 from a closed or folded state.

Longitudinal gestures include a Push gesture and a Pull gesture, are also described in U.S. Patent Application Publication 2012/0204133, referenced above. User 22 can perform the Push gesture by moving hand 30 along Z-axis 36 toward display 28. Likewise, user 22 can perform the Pull gesture by moving hand 30 along Z-axis 36 away from display 28.

In a selection step 68, in response to identifying the Find gesture, computer 26 selects a second interactive object 38 from the subset of interactive objects 38. For example, to select the second interactive object, user can move hand 30 along X-Y plane 40, and upon computer 26 responsively positioning cursor 42 over (or in proximity to) the second interactive object, the user can either transition to a longitudinal gesture or keeping the hand relatively steady for a specific period of time.

Finally, in a performance step 70, in response to detecting the Release gesture, computer 26 performs an operation on the selected second interactive object. Examples of operations that computer 26 can perform on the second interactive object include, but are not limited to:
  Playing a media file. If the second interactive object comprises a media file (e.g., a movie), then computer 26 presents the media file on display 28 upon detecting the Execute gesture comprising either a Release gesture or a TimeClick gesture.
  Execute a software application. If the second interactive object comprises a software application, then computer 26 executes the software application upon detecting the Execute gesture comprising either a Release gesture or a TimeClick gesture.
  Present a child surface 52. If the longitudinal gesture comprises a Pull gesture, and the second interactive object is not associated with content (i.e., a media file or a software application), then the second interactive object comprises a child interactive object 38 of the first interactive object, and computer 26 presents one or more child interactive objects 38 of the second interactive object. For example, if the first interactive object comprises interactive object 38C, then computer 26 initially presents interactive objects 38H, 38I and 38J. Upon user 22 selecting interactive object 38I via a Find gesture, computer 26 presents interactive objects 38K, 38L and 38M upon detecting a Grab gesture followed by a Pull gesture and an Execute gesture comprising a Release gesture, a Find gesture or a TimeClick gesture.

Present a parent surface 52. If the longitudinal gesture comprises a Push gesture, and the first interactive object is root interactive object 38A, then the second interactive object comprises a parent interactive object 38 of the first interactive object, and computer 26 presents one or more child interactive objects 38 of the second interactive object. For example, if the first interactive object comprises interactive object 38I, then computer 26 initially presents interactive objects 38K, 38L and 38M. Upon user 22 selecting interactive object 38C via a Find gesture, computer 26 presents interactive objects 38H, 38I and 38J upon detecting a Grab gesture followed by a Push gesture and an Execute gesture comprising a Release gesture, a Find gesture or a TimeClick gesture.

After selecting the second interactive object in response to the Find gesture performed by the user, the computer can "zoom in" (i.e., increase the size) of the second interactive object in response to detecting user 22 performing a Grab gesture followed by a Pull gesture. While increasing the size of the second interactive object, computer 22 can present context information about the second interactive object. For example, if the second interactive object comprises a movie, computer 22 can present context information such as a plot and a list of actors, as the computer increases the size of the second interactive object.

Figure 4A:
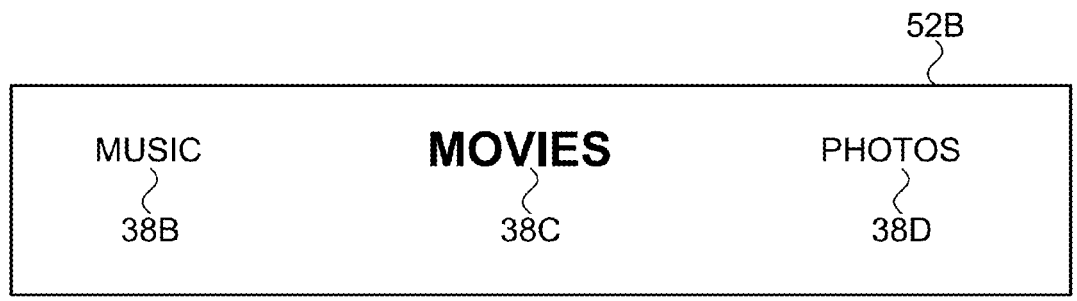
FIGS. 4A-4D are schematic pictorial illustrations showing a multi-level ZoomGrid control scheme, in accordance with an embodiment of the present invention.
Figure 4B:
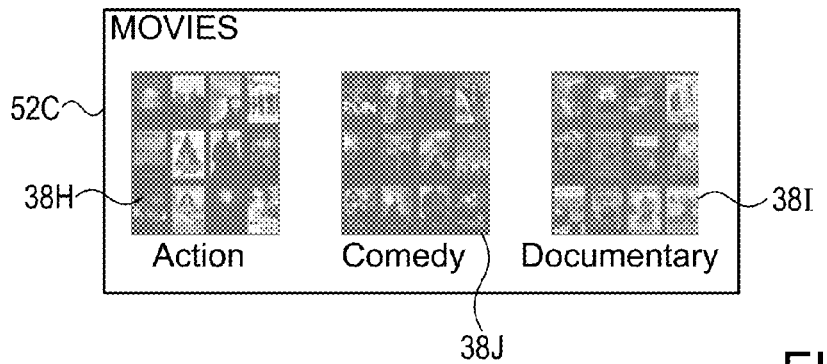
Figure 4C:
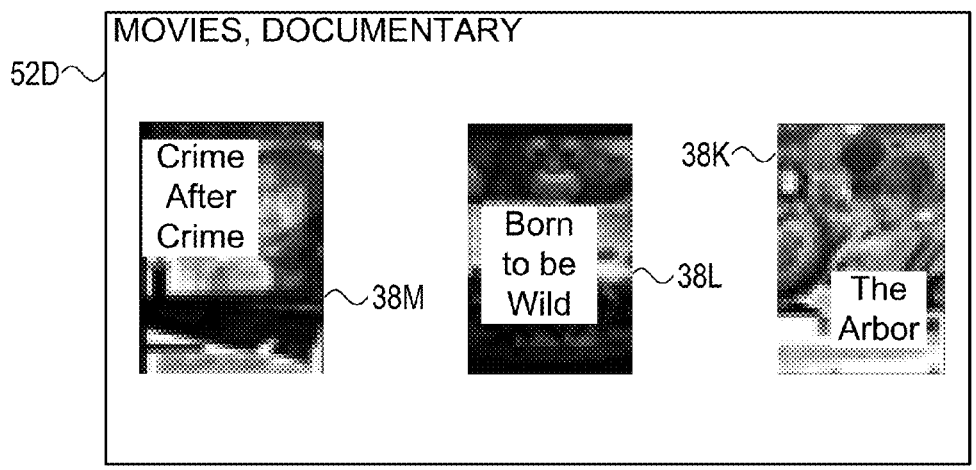
Figure 4D:
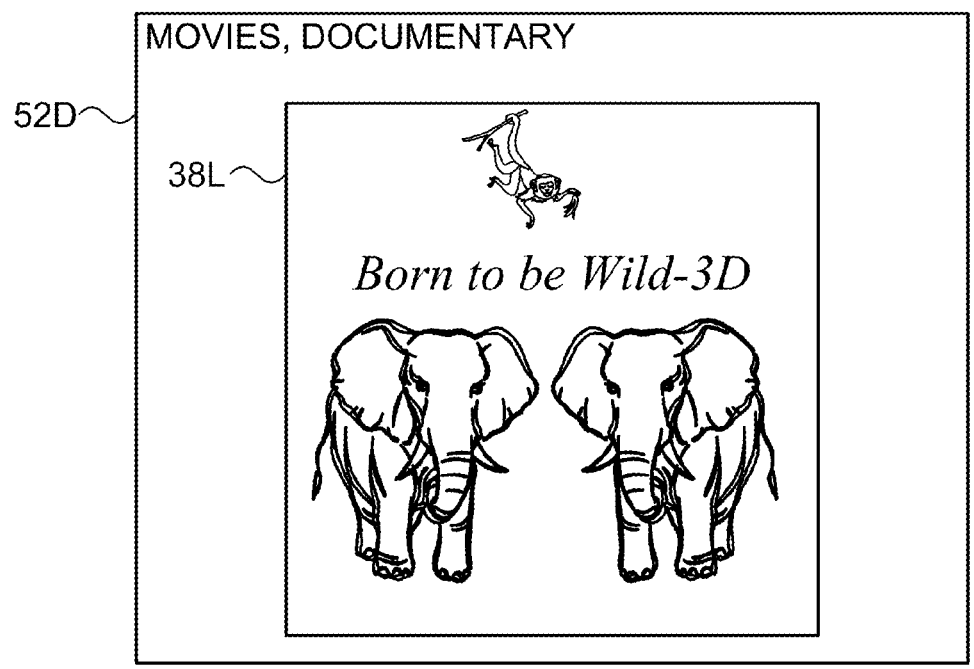

FIGS. 4A-4D are schematic pictorial illustrations showing a multi-level ZoomGrid control scheme based on tree 50, in accordance with an embodiment of the present invention. In the example shown in FIGS. 4A-4D, user 22 traverses ZoomGrid surfaces 52 to start playing a movie referenced by interactive object 38L. Using embodiments described herein, a user gradually zooms in from viewing a menu of media types (ZoomGrid Surface 52A in FIG. 4A), to types categories of movies (ZoomGrid Surface 52C in FIG. 4B), to viewing the movies in a particular category (ZoomGrid Surface 52D in FIG. 4C), and then zooming in to select interactive object 38L for viewing (FIG. 4D).

Comfort Zones and Funnels

Two stabilization mechanisms described U.S. patent application Ser. No. 13/541,786 (referenced above) comprise comfort zones and funnels. While interacting with a multi-level ZoomGrid, computer 26 can define certain zoom levels as "comfort zones," because they enable computer 26 to present interactive objects 38 in a aesthetic manner (for example, with an integer number of rows and columns of icons, with no icons cut off at the edges of the display). In other words computer 26 can "lock" user 22 into a comfort zone (i.e., a comfortable zoom level) while the user browses horizontally (e.g., using a Find gesture).

While in a comfort zone, if user 22 transversely moves hand (i.e., along X-axis 32 and/or Y-axis 34) while display 28 is in a comfort zone, the zoom may be locked, so that only significant motions along Z-axis 36 motions changes the zoom level. Specifically, computer 26 can be configured to assign less significance to hand motion detected along Z-axis 36 than hand motion detected along X-axis 32 and Y-axis 34, while user 22 is performing a Find gesture. In other situations, the zoom levels can be biased in order to drive the display into a comfort zone in response to relatively small movement of hand 30 along Z-axis 36. For example, if a given interactive object 38 comprises a folder of sub-objects 38, then computer 26 can enlarge the given interactive object (and thereby display the sub-objects) upon detecting significant motion of hand 30 away from display 28.

The "Funnel" mechanism enables computer 26 to accommodate any inadvertent transverse motion while user 22 is performing a longitudinal gesture. Specifically, computer 26 can be configured to assign less significance to hand motion detected along X-axis 32 and/or Y-axis 34 than hand motion detected on Z-axis 36, while user 22 is performing a Pull or a Push gesture. Limiting the significance of any transverse motion as computer 26 enlarges (i.e., "zooms in" on) the active interactive object as the user performs a Pull gesture can create a "funnel" like sensation that can help guide the user towards a given interactive object 38 that the user intends to select.

The significance of the transverse motion can be inversely related to a location of hand 30 while performing a Pull gesture. In other words, computer 26 can assign less significance to any detected transverse motion of hand 30 as the distance between the hand and display 28 increases. In operation, if computer 26 "suspects" that user 22 has identified a given interactive object and detects the user starting to perform a Pull gesture, the computer can start to limit the significance of any detected transverse motion of hand 30. As the Pull gesture progresses (and computer 26 further zooms in on the given interactive object) the computer can responsively decrease the significance of any detected transverse motion.

In some embodiments, the "funnel" paradigm can be extended to inhibit the association of hand 30 with a different interactive object 38 when the associated interactive object has been enlarged beyond a predetermined threshold size, responsively to user 22 moving hand 30 away from display 28. In other words, upon computer 26 presenting the associated object at a size equal or greater to the predetermined size, the computer can substantially ignore any transverse movement of hand 30 along X-axis 32 and/or Y-axis 34.

Glass Doors

As described supra, after selecting the second interactive object in response to a Find gesture performed by the user, the computer can "zoom in" (i.e., increase the size) of the second interactive object in response to detecting user 22 performing a Grab gesture followed by a Pull gesture. In embodiments of the present invention, as computer 26 increases the size of the second interactive object, the computer can also present a preview of the second interactive object. For example, in addition (or as an alternative) to increasing the size of the second interactive object, computer 26 can present a "preview" of the second interactive object's child nodes, similar to "peeking" through a glass door.

This glass door metaphor is based on a front glass wall of a store that includes sliding doors that open as a customer approaches the glass. In embodiments of the present invention, a "zoomable object" (i.e., a given interactive object 38 having child nodes) may use the glass door to control how a user interacts with data associated with the zoomable object. To view the data associated with the zoomable object, the user can pull hand 30 back away from the zoomable object, and either open the zoomable object (i.e., open the glass door) or "peek" inside the zoomable object. When the user opens the glass door, the user interface can transition to a comfort zone associated with the zoomable object's associated data.

For example, a given zoomable object may comprise an icon representing a collection of movies in a specific category (e.g., drama or comedy). As the user pulls his hand back away from the icon, computer 26 presents a listing of the movies in the category (i.e., data associated with the icon). Once the user "opens" the glass door, the user can perform an operation on the data associated with the icon (e.g., start playing one of the movies in the category)

Actions that can "open" the Glass Door include:
Performing a TimeClick gesture. The user can keep hand 30 steady for at least a specific time period.
Performing a Release gesture. If the user pulls his hand back, the glass door stays "closed" until the user opens his hand.
Performing a Find gesture (i.e., "break on panning"). If the user starts "swiping" his hand to the left or the right (i.e., a Find gesture), the glass door opens, and the computer scrolls data the presented interactive objects in a direction of the swiping motion.

In embodiments of the present invention, the user can "peek" inside a given glass door without "opening" the door. When peeking inside, the user can view interactive objects 38 at that level, but may not be able to instruct computer 26 to perform an operation on the interactive objects at that level. For example, by pulling the hand back from the documentary movie icon (i.e., interactive object 38I), the user can peek at the documentary movie selection, but the user can only select one of the movies after "opening" the glass door. User 22 can then pull hand 30 back to see the movies in a given category, and then push the hand forward to return to the different movie categories. By opening glass doors, user 22 can transition between different hierarchical levels of the zooming user interface.

For example, to start playing interactive object 38L, in response to user 22 opening a first glass door to select Movies (i.e., interactive object 38C), computer 26 responsively presents icons representing different categories of movies (i.e., interactive objects 38H, 38I and 38J). As user 22 peeks into the Documentary category (i.e., interactive object 38I), computer 26 presents a grid of all the movies (represented by icons) in the Documentary category.

While surface 52D in the example shown in FIG. 2 comprises three interactive objects 38, a given surface 52 may comprise any number of interactive objects 38. For example, if a given surface 52 comprises 200 interactive objects 38, then as user 22 peeks into the given interactive surface, computer 26 can present a "preview" comprising a grid of all the interactive objects of the given surface. However if the user "opens" the glass door to the given surface, then computer 26 can present a more legible subset the interactive objects of the given surface. Computer 26 can present the subset of interactive objects 38 as larger (and more viewable) icons, and the entire selection of icons can be scrolled left or right using embodiments describes in U.S. patent application Ser. No. 13/541,786, referenced above.

In other words, the user can see all the objects at the next hierarchical level when peeking at the level, even though the number of objects shown may limit the visibility of the objects. However of the user opens a glass door to a next hierarchical level, then a smaller (and scrollable) set of objects are shown that enable the user to easily interact with the presented objects.

Methods of peeking that computer 26 can implement to view content (i.e., interactive objects 38) at a given surface 52 include:

Presenting interactive objects 38 in given surface 52. Therefore the user can see if there are 20 or 200 interactive objects 38 in the given surface.
Presenting the interactive objects of the given surface in a "fanned out" format, in a manner similar to a fanned out pile of magazines.
When peeking into an interactive object that is associated with content (e.g., a media file or a software application), the computer can "zoom" an image and/or context information into "full-screen", and not automatically allow zooming into higher zoom levels.

As described supra, when user 22 peeks into a given surface 52, computer 26 can present the interactive objects of the given surface in a "fanned out" format, in a manner similar to a fanned out pile of magazines. When presenting objects at a given hierarchical level, computer 26 can use the following formula to present objects while looking at a first glass door and peeking inside a second glass door (i.e., at the next hierarchical level:

$$\text{Ratio} = (\text{Amount of detail on glass door})/(\text{Amount of detail in collapsed state})$$

where the numerator represents a number of interactive objects 38 at an adjacent lower hierarchical level (i.e., inside a given glass door) and the denominator represents a number of interactive objects 38 that computer 26 presents in detail at the current hierarchical level (i.e., when looking at the given glass door).

Figure 5:
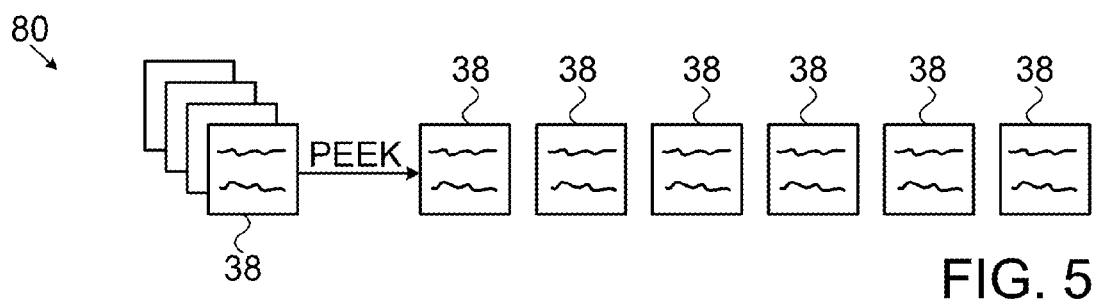
FIG. 5 is a schematic illustration of a pile of interactive objects, in accordance with an embodiment of the present invention.

FIG. 5 is a schematic illustration of a "pile" 80 of interactive objects 38 that is viewable from a given glass door, in accordance with an embodiment of the present invention. In the example shown in FIG. 5, the pile only shows one interactive object 38 (at the top of the pile) in detail. If the user peeks at the pile, then the user can see the six objects (comprising the pile) spread out. Therefore, the ratio in FIG. 5 is 6/1.

Similar to the manner in which the glass door can be used to moderate a zoom-in gesture (i.e., a Pull gesture), a back door can be used to moderate a zoom-out gesture (i.e., a Push gesture). For example, if the user is at a given hierarchical level in FIG. 5 that shows the six interactive objects spread out, the computer can present pile 80 upon the user performing a Push gesture. The user can "exit via the back door" by performing either a TimeClick gesture or a Release gesture. In other words, in a manner similar to peeking inside a glass door, user 22 can peek outside a back door and still remain at the same hierarchy level.

Examples of back door implementations include:
If the user is looking at movie details, upon exiting the back door, computer 26 "collapses" the current interactive object and the zoom level is animated to a higher hierarchy level, e.g., a collection of movies.
If the user is watching a live television broadcast, computer 26 can present details on the next show to be broadcast.

As described supra, depending on a configuration of a given comfort zone, computer 26 can present a group of interactive objects 38 (e.g., icons) either in a pile, a grid or spread out in order to see details on each of the objects. In some embodiments, computer 26 can present the interactive objects in an interpolated layout. For example, a given interpolated layout may present a pile of 25 movies, with four of the movies fanned out.

In some embodiments, a given layout (e.g., interactive objects stacked or fanned out, as shown in FIG. 5) can be dynamically changed. For example, visual effects such as stacking or unstacking a group of interactive objects 38 can be implemented and tied to a position of hand 30 along Z-axis 36. In other words, computer 26 can change a layout of a given group of interactive objects 38 as user 22 performs a longitudinal gesture with hand 30.

In additional embodiments, layout parameters can be changed to mix (i.e., interpolate) a given layout between presenting all the interactive objects as a "fanned out" pile and presenting the interactive objects as pile 80. In some embodiments, computer 26 can dynamically present the interpolation as an animation.

In further embodiments, the interpolated layouts can be nested, thereby enabling computer 26 to mix three or more layouts. Examples of layout that computer 26 can mix include, but are not limited to:

A stack.
A 10×1 grid.
A 5×5 grid.
A random layout.

Media Controls

While playing a media file, computer 26 can present media controls that user 22 can engage using embodiments described herein. Media controls may consist of controls for actions such as play/pause, seek, mute, volume up/down, next/previous track, fast-forward, rewind etc. In embodiments of the present invention, while computer 26 plays a media file (either in the foreground or in the background), the computer can place media player controls an "invisible" ZoomGrid surface 52. During the playback, when the user performs a longitudinal gesture, the ZoomGrid surface containing the imaginary controls gradually becomes visible. User 22 can select the media controls in a manner similar to selecting any other interactive objects 38 presented on a ZoomGrid surface.

In operation, while playing a media file (i.e., subsequent to performing the operation on the selected interactive object 38 in step 70), computer 26 can receive an additional set of 3D maps and detect, in the additional set of 3D maps, an additional Grab gesture followed by an additional Find gesture followed by a further Grab gesture followed by an additional Release gesture. Computer 26 can present one or more media controls in response to the additional Grab gesture, and position cursor 42 in response to the additional Find gesture. Upon detecting the further Grab gesture, computer 26 can identify one of the one or more media controls presented in proximity to cursor 42, and perform an operation associated with the one of the one or more media controls (e.g., increasing the volume) upon detecting the additional Release gesture.

A special behavior of the ZoomGrid based player controls mechanism is that upon selecting a given control, the controls surface can retract back and "disappear" (i.e., as if a spring connects it to the surface on which the media is playing). Toggle controls like mute/unmute or pause/play or buttons can be implemented again by the same embodiments as those used to select the interactive objects (i.e., the object selection triggers a given operation). Computer 26 can implement continuous controls such as volume and seek by identifying further gestures, as explained hereinbelow.

Figure 6:
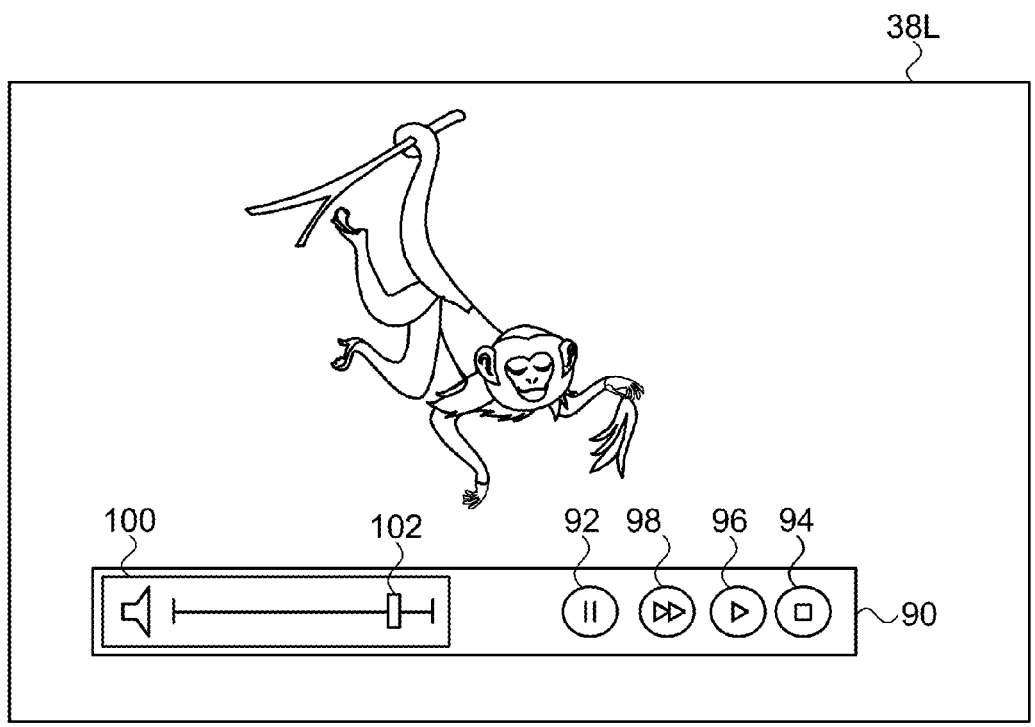
FIG. 6 is a schematic pictorial illustration of a first example of a ZoomGrid-based media player control, in accordance with an embodiment of the present invention.

FIG. 6 is a schematic pictorial illustration of a first example of a ZoomGrid based media player control, in accordance with an embodiment of the present invention. While playing interactive object 38L, computer 26 can present a one-dimensional ZoomGrid 90 in response to the user performing a Pull gesture. ZoomGrid 90 comprises a pause control 92, a stop control 94, play control 96, and a seek control 98. In the example shown in FIG. 6, user 22 has selected a volume control 100 using embodiments described herein, and can manipulate a volume slider icon 102 via transverse hand motions along X-axis 32.

As described supra, computer 26 can implement continuous controls such as volume and seek by identifying further gestures performed by hand 30. For example, if computer 26 identifies volume slider icon 102 in response to the additional Pull gesture, computer 26 can adjust an audio volume level (and reposition the volume slider icon) in response to detecting, in the additional set of 3D maps, a further Find gesture subsequent to the additional Pull gesture and prior to the additional Release gesture. Upon detecting the additional Release gesture subsequent to the further Find gesture, computer 26 can maintain the audio volume level indicated by a position of the volume slider icon on display 28.

Figure 7:
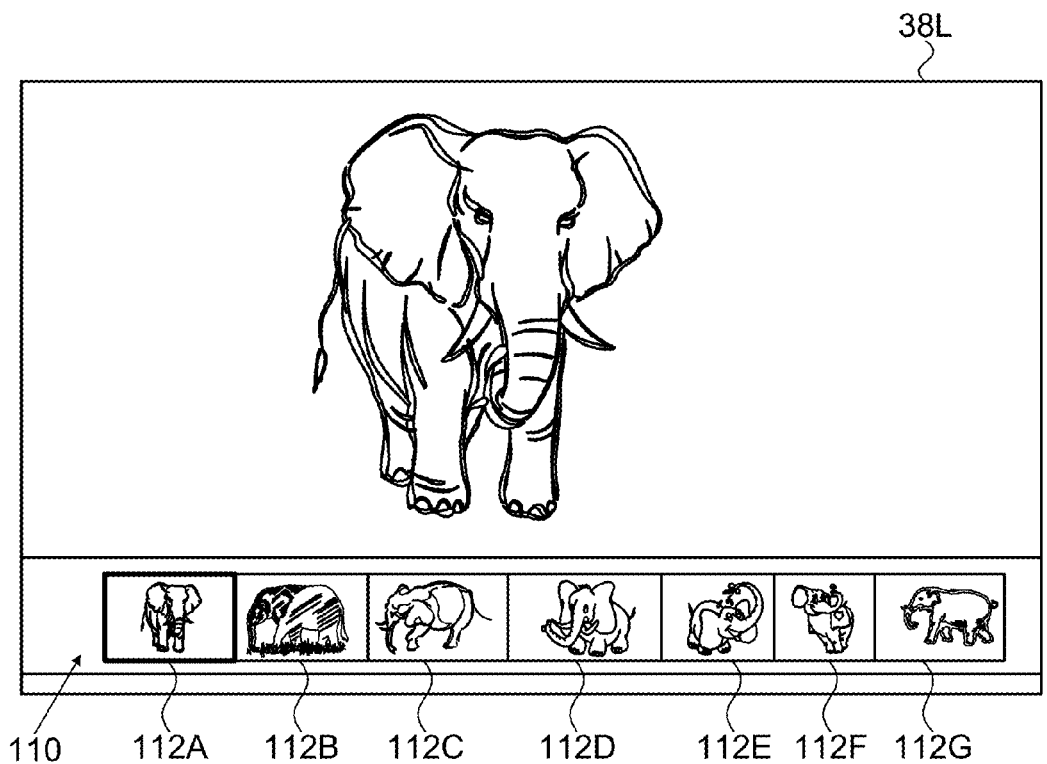
FIG. 7 is a schematic pictorial illustration of a second example of a ZoomGrid-based media player control, in accordance with an embodiment of the present invention.

FIG. 7 is a schematic pictorial illustration of a second example of a ZoomGrid based media player control, in accordance with an embodiment of the present invention. In response to user 22 selecting seek control 78 using embodiments described herein, computer 26 presents a one-dimensional ZoomGrid 110 that comprises scrub points 112A-112G. The scrub points comprise specific scenes in movie 38L that user 22 can directly skip to by selecting one of the scrub points using the embodiments described herein. In the example shown in FIG. 7, user 22 has selected scrub point 112A, and the computer responsively presents a given scene in movie 38L that corresponds to the selected scrub point.

Zoomgrid Keyboard

Figure 8:
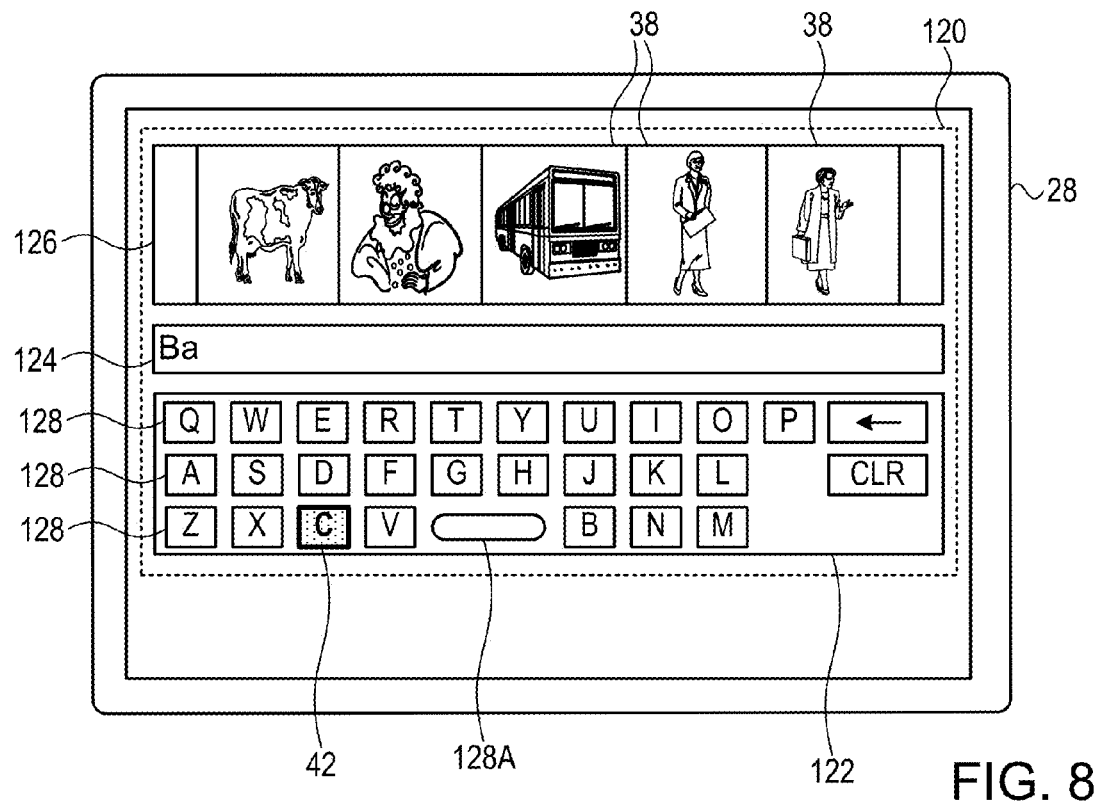
FIG. 8 is a pictorial illustration of an on-screen keyboard, in accordance with an embodiment of the present invention.

FIG. 8 is a pictorial illustration of an on-screen keyboard 120 for use by non-tactile 3D user interface 20, in accordance with an embodiment of the present invention. On-screen keyboard 120 comprises a keys area 122, a text input area 124 and a results area 126. In the example shown in FIG. 8, computer 26 presents, in keys area 122, a space bar 128A within a bottom row of alphanumeric keys 128, thereby reducing space taken up by the on-screen keyboard on display 28.

In embodiments of the present invention, computer 26 presents an image of keyboard 120 on display 28, and receives a sequence of three-dimensional (3D) maps including a hand 30. Upon processing an initial portion of the sequence of 3D maps and detecting hand 30 performing a Find gesture, computer 26 positions, on display 28, cursor 42 at a position indicated by the Find gesture. While presenting cursor 42 in proximity to a given key 128, and detecting in a subsequent portion of the sequence of 3D maps, a Grab gesture followed by a Pull gesture followed by a Release gesture, computer 26 selects the given key.

In operation, as user 22 performs a Find gesture by moving hand 30 along X-Y plane 40, computer 26 responsively highlights a given key 128. Upon performing a Grab gesture followed by a Pull gesture, computer 26 can convey visual feedback such as increasing the size of the given key ("C" as shown in the figure), and upon detecting the Release gesture, the computer can present a character associated with the given key in text input area 124. In some embodiments, upon user 22 transitioning the hand's motion from the X-Y plane to the Z-axis (i.e., pulling the hand back), computer 26 can convey visual feedback such as increasing the size of the given key, as shown in FIG. 8. In additional embodiments, user 22 can delete the last character entered by performing a Push gesture (i.e., "undo").

In some configurations, computer 26 can select a given key upon detecting, in the 3D maps, a Find gesture followed by a Grab gesture. In other words, while computer 26 is highlighting a given key 128, the computer can select the given key upon detecting a Grab gesture while the given key is highlighted.

In the configuration shown in FIG. 8, as user 22 enters text using keyboard 120, computer 26 can present search results in results area 126. For example, as user starts entering a name of a movie, computer 26 can present one or more interactive objects 38 whose name matches text entered by the user. Using embodiments described herein, user 22 can select a given interactive object presented in results area 126.

Off-Screen Interaction

While interacting with non-tactile 3D user interface 20, user 22 typically manipulates interactive objects 38 presented on display 28. However, when using a computer or a device controlled by a tactile user interface, there may be controls that are positioned outside the display. For example, Android™ smartphones have buttons positioned below the touch screen.

In embodiments of the present invention, upon computer 26 receiving a sequence of three-dimensional (3D) maps containing at least hand 30 positioned in proximity to display 28 and detecting, in the 3D maps, a pointing gesture directed toward a region external to the display and adjacent to an edge of the display, the computer can present one or more interactive objects 38 on display in response to the pointing gesture. In some embodiments, computer 26 can present the one or more interactive objects along the edge of the display that is adjacent to the regions.

A pointing gesture typically comprises user 22 pointing a finger of hand 30 toward display 28 to select a given interactive object 38 presented on the display, and are described in PCT International Publication WO 2012/107892, whose disclosure is incorporated herein by reference. In embodiments of the present invention, user 22 may perform a pointing gesture to a region outside display 28.

Figure 9A:
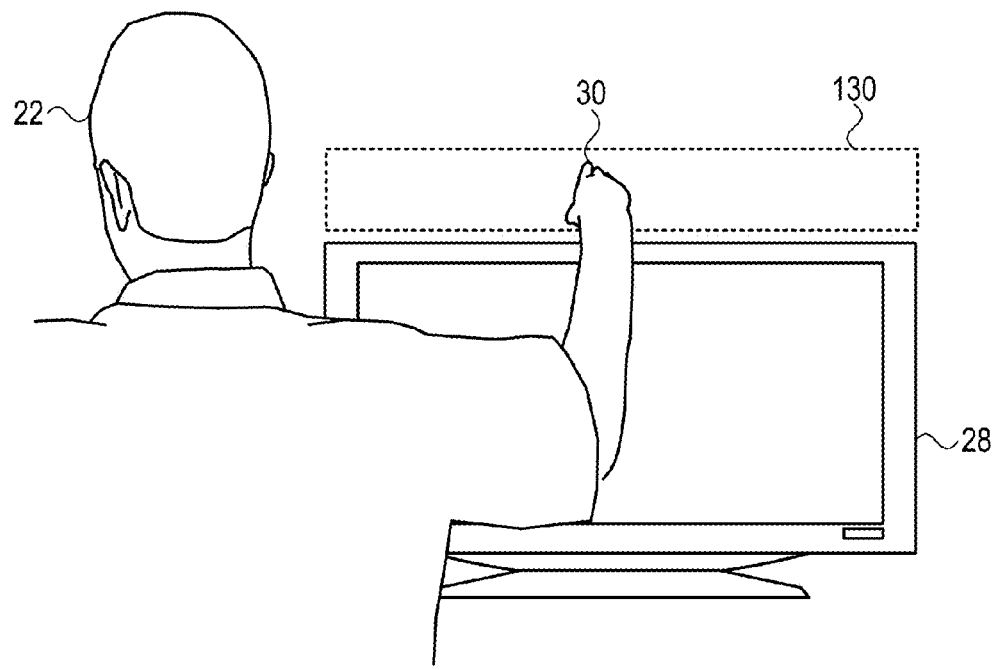
FIGS. 9A-9C are schematic pictorial illustrations of a user of the computer system implementing a non-tactile zoom-based user interface performing an off-screen interaction, in accordance with an embodiment of the present invention.
Figure 9B:
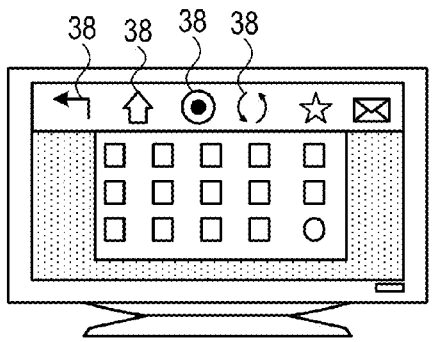
Figure 9C:
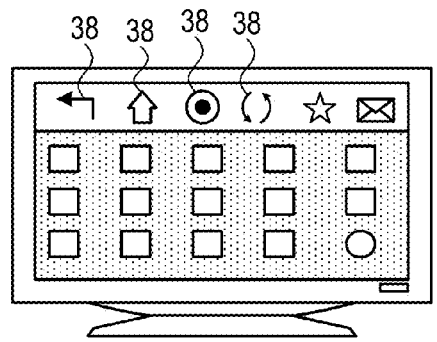

FIGS. 9A-9C are schematic pictorial illustrations of user 22 performing an off-screen interaction, in accordance with an embodiment of the present invention. In FIG. 9A, user points hand 30 above the display toward a region 130. In response to the user pointing hand at region 130, computer 26 can zoom out any content that is currently being shown on the display, and present interactive objects 38 on display 28, as shown in FIG. 9B. Alternatively, computer 26 can dim the content while presenting interactive objects 28, as shown in FIG. 9C.

User Intention Rating System

While user 22 may have two hands 30 in proximity to sensing device 24, the user interacts with the computer one of the hands at any given time. Additionally, there may be multiple individuals in a field of view of sensing device 24. Embodiments of the present invention provide methods and systems for rating each hand 30 within the field of view of sensing device 24 in order to identify which of the hands is most likely intentionally interacting with non-tactile 3D user interface 20.

In operation, computer 26 detects at least two hands 30 of at least one user 22, and assigns a respective ranking value (also referred to herein as a rating) to each of the hands based on a position of each of the hands. Although the configuration of sensing device 24 shown in FIG. 1 comprises a 3D sensor, the sensing device may also comprise a two-dimensional (2D) optical sensor. Therefore, in some embodiments, computer 26 can receive a two-dimensional (2D) image from sensing device 24, and identify at least two hands 30 in the 2D image. In alternative embodiments computer 26 can receive an initial set of 3D maps from sensing device 24, and detect at least two hands 30 in the initial sequence of 3D maps.

Computer 26 can then select a given hand 30 from among the at least two hands responsively to the respective ranking values, and upon receiving a sequence of three-dimensional (3D) maps containing at least the selected hand positioned in proximity to display 28, computer 26 can analyze the 3D maps to detect a gesture performed by the selected hand. In embodiments where computer 26 identifies hands 30 from an initial sequence of 3D maps, the 3D maps that the computer analyzes to detect a gesture comprise a set of 3D maps that computer 26 receives subsequent to receiving the initial set of 3D maps that were used to detect the two or more hands.

In some embodiments, the computer can identify hands 30 within the field of view, detect poses of the user(s) positioned within the field of view, and assign a rating based on the position of each the hands and the pose of each of the users. If the rating for a given hand 30 exceeds a defined threshold, then the computer can accept gestures from the given hand (i.e., the hand is active). During times where there is no user 22 interacting with the system, the computer may require a more overt gesture in order to select a given hand 30 as being active.

Figure 10:
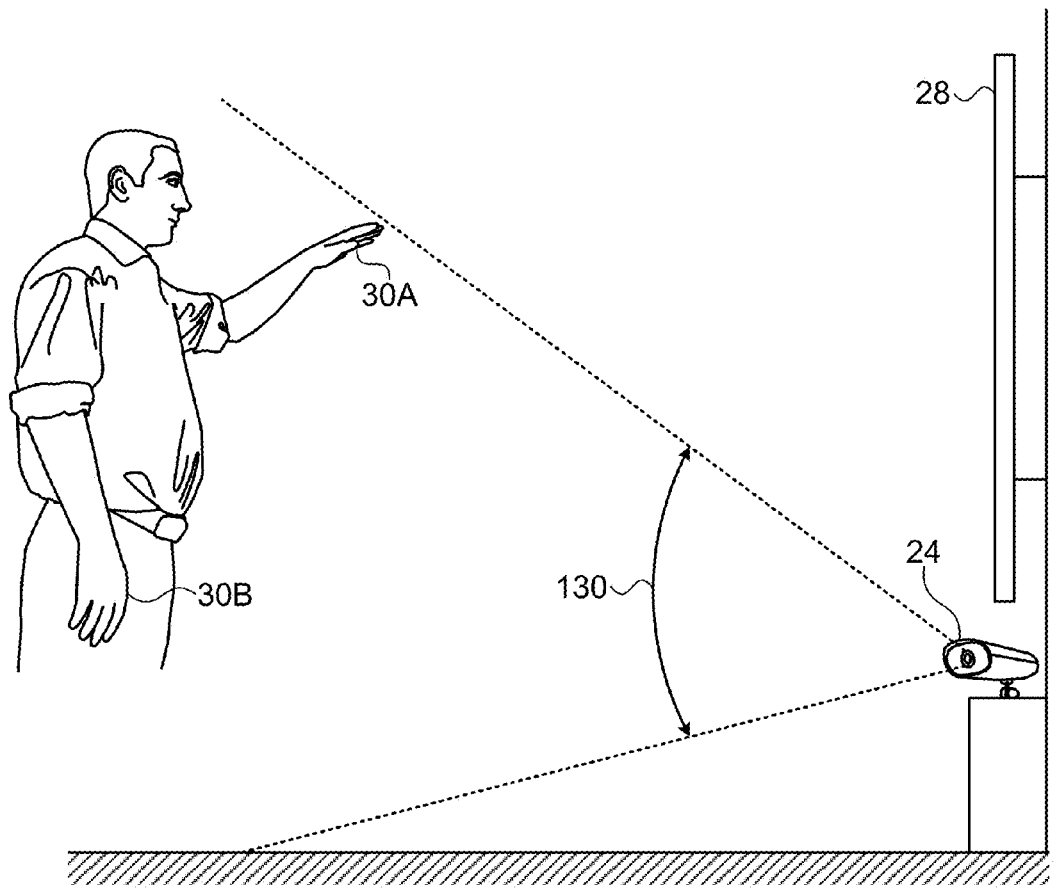
FIG. 10 is a schematic illustration of the user positioning both hands within a field of view of a sensing device coupled to the computer system implementing a non-tactile zoom-based user interface, in accordance with an embodiment of the present invention.

FIG. 10 is a schematic illustration of user 22 with hands 30 positioned within a field of view 130 of sensing device 24, in accordance with an embodiment of the present invention. In the description herein, hands 30 may be differentiated by appending a letter to the identifying numeral, so that hands 30 comprise hand 30A and hand 30B.

In the example shown in FIG. 10, user 22 raises hand 30A (i.e., the left hand) and rests hand 30B (i.e., the right hand) at the user's side. Computer 26 can apply a higher score to hand 30A since the left hand is raised and positioned closer to the display. If there are additional individuals in the room, computer 26 can also take into account the fact that the user is positioned relatively close to the display and is facing the display, thereby increasing the rating of both the user's hands.

For example, computer 26 may be configured to identify gestures performed with both of the hands, and the rating can be used to identify which of the individuals is most likely interacting with user interface 20. Additionally or alternatively, the hand ratings can be used for session management and for reducing false positives (i.e., reducing chances that the computer interprets a motion of a given hand 30 as a gesture, when the user did not intend to perform a gesture).

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:
1. A method, comprising:
   arranging, by a computer, multiple interactive objects as a hierarchical data structure, each node of the hierarchical data structure associated with a respective one of the multiple interactive objects;

presenting, on a display coupled to the computer, a first subset of the multiple interactive objects that are associated with one or more child nodes of one of the multiple interactive objects;

receiving a sequence of three-dimensional (3D) maps including at least part of a hand of a user positioned in proximity to the display;

identifying, in the sequence of three-dimensional (3D) maps, the hand performing a transverse gesture followed by a grab gesture followed by a longitudinal gesture followed by an execute gesture;

selecting, in response to the transverse gesture, an object from the first subset of the multiple interactive objects; and in response to the grab gesture, the longitudinal gesture and the execute gesture, presenting, on the display, a second subset of the multiple interactive objects that are associated with one or more child nodes of the selected object, wherein the execute gesture is selected from a list comprising a timeclick gesture, a release gesture and a subsequent transverse gesture.

2. The method according to claim 1, wherein the longitudinal gesture comprises a pull gesture.

3. The method according to claim 2, and comprising presenting a preview of the second subset of the multiple interactive objects upon detecting the pull gesture.

4. The method according to claim 1, and comprising assigning less significance to a transverse motion of the hand than to a longitudinal motion of the hand upon detecting a start of the longitudinal gesture.

5. The method according to claim 1, and comprising assigning less significance to a longitudinal motion of the hand than to a transverse motion of the hand upon detecting a start of the transverse gesture.

6. The method according to claim 1, and comprising changing a layout of the subset of the multiple interactive objects in response to the longitudinal gesture.

7. A method, comprising:
arranging, by a computer, multiple interactive objects as a hierarchical data structure, each node of the hierarchical data structure associated with a respective one of the multiple interactive objects;

presenting, on a display coupled to the computer, a subset of the multiple interactive objects that are associated with one or more child nodes of one of the multiple interactive objects;

receiving a sequence of three-dimensional (3D) maps including at least part of a hand of a user positioned in proximity to the display;

identifying, in the sequence of three-dimensional (3D) maps, the hand performing a transverse gesture followed by a grab gesture followed by a pull gesture followed by an execute gesture;

selecting, in response to the transverse gesture, a media file from the subset of the multiple interactive objects;

in response to the grab gesture, the longitudinal gesture and the execute gesture, playing the selected media file; and receiving, while playing the media file, an additional set of 3D maps, detecting, in the additional set of 3D maps, an additional grab gesture followed by an additional transverse gesture followed by a further grab gesture followed by an additional release gesture, presenting one or more media controls in response to the additional grab gesture, positioning a cursor in response to the transverse gesture in the additional set of 3D maps, identifying, upon detecting the further grab gesture, one of the one or more media controls presented in proximity to the cursor, and performing an operation associated with the one of the one or more media controls upon detecting the additional release gesture.

8. The method according to claim 7, wherein each of the one or more media controls is selected from a list comprising a play and pause control, a seek control, a volume and mute control, a fast forward control, a rewind control, a next track control and a previous track control.

9. An apparatus, comprising:
a sensing device;
a display; and
a computer coupled to the sensing device and the display, and configured to arrange multiple interactive objects as a hierarchical data structure, each node of the hierarchical data structure associated with a respective one of the multiple interactive objects, to present, on the display, a first subset of the multiple interactive objects that are associated with one or more child nodes of one of the multiple interactive objects, to receive a sequence of three-dimensional (3D) maps including at least part of a hand of a user positioned in proximity to a display coupled to the computer, to identify, in the sequence of three-dimensional (3D) maps, the hand performing a transverse gesture followed by a grab gesture followed by a longitudinal gesture followed by an execute gesture, to select, in response to the transverse gesture, one of the first subset of the multiple interactive objects, and, in response to the grab gesture, the longitudinal gesture and the execute gesture, to present, on the display, a second subset of the multiple interactive objects that are associated with one or more child nodes of the selected one of the first subset of the multiple interactive objects, wherein the execute gesture is selected from a list comprising a timeclick gesture, a release gesture and a subsequent transverse gesture.

10. The apparatus according to claim 9, wherein the longitudinal gesture comprises a pull gesture.

11. The apparatus according to claim 10, wherein the computer is configured to present a preview of the second subset of the multiple interactive objects upon detecting the pull gesture.

12. The apparatus according to claim 9, wherein the computer is configured to assign less significance to a transverse motion of the hand than to a longitudinal motion of the hand upon detecting a start of the longitudinal gesture.

13. The apparatus according to claim 9, wherein the computer is configured to assign less significance to a longitudinal motion of the hand than to a transverse motion of the hand upon detecting a start of the transverse gesture.

14. The apparatus according to claim 9, wherein the computer is configured to change a layout of the subset of the multiple interactive objects in response to the longitudinal gesture.

15. An apparatus, comprising:
a sensing device;
a display; and
a computer coupled to the sensing device and the display, and configured:
to arrange multiple interactive objects as a hierarchical data structure, each node of the hierarchical data structure associated with a respective one of the multiple interactive objects,
to present, on the display, a first subset of the multiple interactive objects that are associated with one or more child nodes of one of the multiple interactive objects, to receive a sequence of three-dimensional (3D) maps including at least part of a hand of a user positioned in proximity to a display coupled to the computer, to identify, in the sequence of three-dimensional (3D) maps, the hand performing a transverse gesture followed by a grab gesture followed by a pull gesture followed by an execute gesture, to select, in response to the transverse gesture, a media file from the subset of the multiple interactive objects, to perform, in response to the grab gesture, the pull gesture and the execute gesture, an operation associated with the selected one of the first subset of the multiple interactive objects, to receive, while playing the media file, an additional set of 3D maps, to detect, in the additional set of 3D maps, an additional grab gesture followed by an additional transverse gesture followed by a further grab gesture followed by an additional release gesture, to present one or more media controls in response to the additional grab gesture, to position a cursor in response to the additional transverse gesture, to identify, upon detecting the further grab gesture, one of the one or more media controls presented in proximity to the cursor, and to perform an operation associated with the one of the one or more media controls upon detecting the additional release gesture.

16. The apparatus according to claim 15, wherein each of the one or more media controls is selected from a list comprising a play and pause control, a seek control, a volume and mute control, a fast forward control, a rewind control, a next track control and a previous track control.

17. A computer software product comprising a non-transitory computer-readable medium, in which program instructions are stored, which instructions, when read by a computer executing a user interface, cause the computer to arrange multiple interactive objects as a hierarchical data structure, each node of the hierarchical data structure associated with a respective one of the multiple interactive objects, to present, on a display, a first subset of the multiple interactive objects that are associated with one or more child nodes of one of the multiple interactive objects, to receive a sequence of three-dimensional (3D) maps including at least part of a hand of a user positioned in proximity to a display coupled to the computer, to identify, in the sequence of three-dimensional (3D) maps, the hand performing a transverse gesture followed by a grab gesture followed by a longitudinal gesture followed by an execute gesture, to select, in response to the transverse gesture, one of the first subset of the multiple interactive objects, and, in response to the execute gesture, the longitudinal gesture and the execute gesture, to present, on the display, a second subset of the multiple interactive objects that are associated with one or more child nodes of the selected one of the first subset of the multiple interactive objects, wherein the execute gesture is selected from a list comprising a timeclick gesture, a release gesture and a subsequent transverse gesture.

\* \* \* \* \*